United States Patent
Kano

(10) Patent No.: US 10,593,912 B2
(45) Date of Patent: Mar. 17, 2020

(54) BATTERY PACK

(71) Applicant: Murata Manufacturing Co., Ltd., Kyoto (JP)

(72) Inventor: Hiroshi Kano, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 218 days.

(21) Appl. No.: 15/710,077

(22) Filed: Sep. 20, 2017

(65) Prior Publication Data

US 2018/0013106 A1 Jan. 11, 2018

Related U.S. Application Data

(63) Continuation of application No. 14/422,835, filed as application No. PCT/JP2013/004650 on Aug. 1, 2013, now Pat. No. 9,774,016.

(30) Foreign Application Priority Data

Aug. 30, 2012 (JP) .................. 2012-189600

(51) Int. Cl.
*H01M 2/10* (2006.01)
*B60L 3/00* (2019.01)
(Continued)

(52) U.S. Cl.
CPC ......... *H01M 2/1005* (2013.01); *B60L 3/0007* (2013.01); *B60L 50/20* (2019.02); *B60L 50/64* (2019.02); *B60L 55/00* (2019.02); *H01M 2/1077* (2013.01); *H01M 2/1094* (2013.01); *H01M 2/14* (2013.01); *H01M 2/18* (2013.01); *B60L 2200/12* (2013.01); *H01M 10/0422* (2013.01); *H01M 10/052* (2013.01); *H01M 10/4257* (2013.01); *H01M 2220/10* (2013.01); *H01M 2220/20* (2013.01); *Y02E 60/721* (2013.01); *Y02T 10/7005* (2013.01); *Y02T 10/705* (2013.01); *Y02T 10/7072* (2013.01); *Y02T 90/121* (2013.01); *Y02T 90/128* (2013.01);
(Continued)

(58) Field of Classification Search
None
See application file for complete search history.

(56) References Cited

U.S. PATENT DOCUMENTS

2003/0059676 A1* 3/2003 Ruiz Rodriguez . H01M 2/0242
429/164
2006/0286441 A1 12/2006 Toshiyuki et al.
(Continued)

FOREIGN PATENT DOCUMENTS

JP 2001-148235 A 5/2001
JP 2011-103249 A 5/2011
JP 2012-074162 A 4/2012

OTHER PUBLICATIONS

International Search Report issued in connection with International Patent Application No. PCT/JP2013/004650, dated Dec. 20, 2013. (3 pages).

*Primary Examiner* — Christopher P Domone
(74) *Attorney, Agent, or Firm* — K&L Gates LLP

(57) ABSTRACT

A battery pack is provided. The battery pack including a plurality of battery cells; a cell holder including a peripheral wall and a plurality of cell storage units; and a plurality of ribs integrally molded with the cell holder between the peripheral wall of the cell holder and the cell storage unit.

16 Claims, 22 Drawing Sheets

(51) Int. Cl.
*H01M 2/18* (2006.01)
*H01M 2/14* (2006.01)
*H01M 10/04* (2006.01)
*H01M 10/42* (2006.01)
*H01M 10/052* (2010.01)
*B60L 50/64* (2019.01)
*B60L 55/00* (2019.01)
*B60L 50/20* (2019.01)

(52) U.S. Cl.
CPC .............. *Y02T 90/14* (2013.01); *Y02T 90/163* (2013.01); *Y04S 10/126* (2013.01)

(56) References Cited

U.S. PATENT DOCUMENTS

| | | | | |
|---|---|---|---|---|
| 2010/0119928 A1* | 5/2010 | Yoon | ........................ | H01M 2/10 |
| | | | | 429/120 |
| 2010/0248004 A1* | 9/2010 | Takeshita | ............ | H01M 2/1055 |
| | | | | 429/156 |
| 2011/0293986 A1* | 12/2011 | Kozu | .................... | H01M 2/105 |
| | | | | 429/120 |
| 2011/0294000 A1 | 12/2011 | Myeongcheol et al. | | |

* cited by examiner

BATTERY PACK

CROSS REFERENCES TO RELATED APPLICATIONS

The present application is a continuation of U.S. patent application Ser. No. 14/422,835 filed on Feb. 20, 2015, which is a national stage of International Application No. PCT/JP2013/004650 filed on Aug. 1, 2013 and claims priority to Japanese Patent Application No. 2012-189600 filed on Aug. 30, 2012, the disclosure of which is incorporated herein by reference.

BACKGROUND

The present disclosure relates to a battery pack capable of being used for the power source of an electric power-assisted bicycle, an electric motorcycle or the like, and an electric vehicle which uses the battery pack.

An electric power-assisted bicycle is a bicycle which performs input aids by an electric motor. An electric motorcycle can travel by using only the electric motor. A battery pack is used as the power source of the electric motor. For example, a lithium-ion secondary battery which uses doped or undoped lithium ion is used as the battery pack. In a case of the electric power-assisted bicycle, the electric motor is attached to the base or the like of a pedal.

When a battery pack is charged, the battery pack is removed first from the bicycle, and the battery pack is charged using the power source of a household and a dedicated battery charger. Therefore, in a case of the battery pack of an electric power-assisted bicycle, an operation to remove, transport, and attach the battery pack is often performed. In addition, in a case of the electric power-assisted bicycle, a necessary battery capacity is comparatively large, and thus the battery pack thereof becomes heavy. For example, there is a case in which the battery pack is equal to or greater than 3 kg. Therefore, if the battery pack is dropped when an operation to replace the battery pack is performed, a large impact is applied to the battery pack. If external impact is propagated to battery cells in the battery pack, the external impact causes liquid to leak out of the battery cells and causes the battery cells to be transformed.

Therefore, it is desirable to improve the impact resistance of the battery pack and to prevent external impact from being propagated to the battery cells. PTL 1 below discloses a technology in which a buffer material is inserted to the inside of a battery pack and impact applied to the battery pack is absorbed by the buffer material.

SUMMARY

In the technology disclosed in PTL 1, an elastic member is used in addition to a battery casing, and thus there is a disadvantage in manufacturing costs because the elastic member is used, and there is a problem of an increase in the number of processes to manufacture the battery pack. When the elastic member is not used, for example, it is conceivable to provide ribs to attenuate impact. However, in the related art, the ribs directly come into contact with battery cells. Therefore, there is a problem in that external impact is directly propagated to the battery cells through the ribs.

Therefore, it is desirable to provide a battery pack which excels in impact resistance without using an elastic member as a separate component, and an electric vehicle.

In order to solve the above problems, a battery pack according to an embodiment of the present disclosure includes: a plurality of battery cells; a cell support that holds the plurality of battery cells; a connection part that connects to the plurality of battery cells; and a circuit substrate that is used to mount circuits for the plurality of battery cells. The cell support is integrally formed with battery cell storage units that store the plurality of battery cells, a base unit that supports the battery cell storage units, and impact relaxation ribs, and each of the impact relaxation ribs is formed between an outer circumference of the base unit and an exterior surface of each of the battery cell storage units, and is configured in a shape capable of being transformed in a direction to which impact is applied.

An electric vehicle according to an embodiment of the present disclosure receives the supply of electric power from the above-described battery pack.

Advantageous Effects of Invention

According to at least one embodiment, it is possible to improve the impact resistance of the battery pack without using a buffer material which is a separate component. Additional features and advantages are described herein, and will be apparent from the following Detailed Description and the figures.

DETAILED DESCRIPTION

Hereinafter, embodiments of the present disclosure will be described with reference to the accompanying drawings. Meanwhile, description will be performed in the order below.
1. Embodiment
2. Application Example
3. Modification Example Meanwhile, the present disclosure is not limited to an embodiment which will be described below. Although the back and forth, right and left, and up and down directions are indicated for convenience of explanation in the description below, the content according to the embodiment of the present disclosure is not limited to the corresponding directions.

1. Embodiment

First, the outline of the configuration of a battery pack will be described. The outline of the configuration of the battery pack is as follows. The battery pack includes a plurality of battery cells, and the plurality of battery cells are held by cell holders which function as cell supports. The terminal contact parts of connection plates which function as connection parts are joined to the positive electrode terminal parts or the negative electrode terminal parts of the respective battery cells, and thus the battery cells are electrically connected by the connection plates. Further, a protection circuit or the like is provided on a printed circuit board. A battery block which includes the cell holders in which the plurality of battery cells are stored, the connection plates, the printed circuit board and the like are stored in a waterproof pouch and, further, stored in an exterior casing if necessary, and thus the battery pack is formed.

Although a battery pack which is used for an electric power-assisted bicycle will be described, the battery pack according to the embodiment of the present disclosure can be used for other purposes. The configuration of the battery pack, for example, the number and the connection state of the battery cells, the shape of the exterior casing and the like can be appropriately changed depending on the purpose of the battery pack.

[Overall Configuration of Battery Block]

Figure 1:
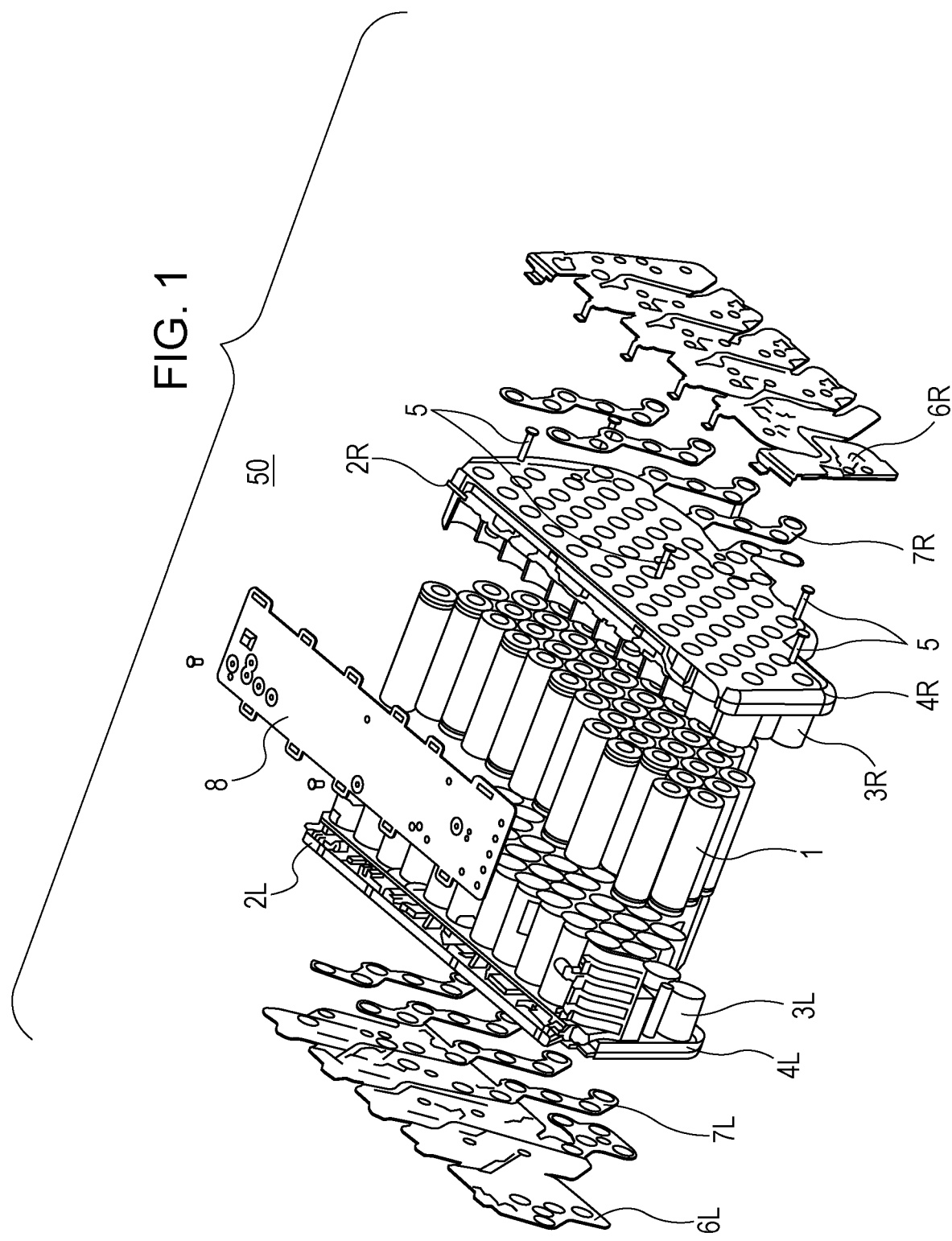
FIG. 1 is an exploded perspective view illustrating a battery block according to an embodiment.

FIG. 1 is an exploded perspective view illustrating the overall configuration of a battery block 50 according to an embodiment. As described above, a battery pack is configured in such a way that the battery block 50 is stored in an exterior casing. A plurality of battery cells 1, for example, a cylindrically-shaped lithium ion secondary battery is used. As an example, 50 battery cells 1 are held by cell holders 2L and 2R. The battery cells 1 include one end on which positive electrode terminal parts are formed, and the other ends on which negative electrode terminal parts are formed.

Meanwhile, the shapes of the battery cells 1 are not limited to the cylindrical shape and may have another shape such as a square shape or the like. The battery cells 1 may be a nickel metal hydride battery or a nickel-cadmium battery.

The cell holders 2L and 2R are respectively formed such that cylindrical cell storage units 3L and 3R, the numbers of which are equal to or greater than the number of battery cells to be stored, protrude from base units 4L and 4R which function as base units. The cell holders 2L and 2R are resin molded products, and the cell storage units 3L and 3R are integrally formed with the respective base units 4L and 4R.

For example, an insulating material, such as plastic or the like, is used as the material of the cell holders 2L and 2R. The material of the cell holders 2L and 2R may be a thermally-conductive material which includes metallic powder or carbon and which has high thermal conductivity. When such a material is used, heat generated from the battery cells 1 can be effectively radiated to the outside. The material of the cell holders 2L and 2R may be a reinforced plastic which includes glass fiber or carbon fiber and which excels in mechanical strength. When such a material is used, it is possible to increase the mechanical strength of the cell holders 2L and 2R with regard to external impact.

The cell storage units 3L and 3R have the same shape. When the cell holders 2L and 2R face each other, the corresponding openings of the cell storage units 3L and 3R coincide with each other. The cell storage units 3L and 3R include diameters and depths which are necessary to store the battery cells 1. That is, the total length of the internal space of the cell storage units 3L and 3R is substantially equal to the height of the battery cells 1. The cell holders 2L and 2R which face each other are held by screws 5 in a state in which the battery cells 1 are stored in the cell storage units 3L and 3R.

It is possible to securely insulate between the battery cells using the cell holders 2L and 2R. Therefore, compared to a structure according to the related art which uses an insulating tape or the like in which pasting positions are easily deviated, it is possible to obtain high security. Further, since the battery cells 1 are stably fixed to the cell storage units 3L and 3R of the cell holders 2L and 2R, it is possible to prevent the positions of the battery cells 1 from being deviated due to external impact.

Circular openings, which communicate with the cell storage units 3L and 3R, are formed in the base units 4L and 4R of the cell holders 2L and 2R. The positive electrode terminals or the negative electrode terminals of the battery cells 1 are exposed through the openings. Connection plates 6L and 6R adhere to the terminals of the battery cells 1, and thus the connection relationship of the 50 battery cells 1 is defined. Each of the connection plates 6L and 6R is divided into, for example, 5 portions, and has forms which correspond to the respective regions which are obtained through division and in which 10 battery cells 1 are arranged. The cell holders 2L and 2R include ribs which define the respective installation positions which are included in the connection plates 6L and 6R and obtained through division. The connection plates 6L and 6R are formed of a material which excels in a conductive property and has an excellent welding property with respect to the terminal parts of the battery cells 1.

In order to connect the electrodes of the battery cells 1 to the connection plates 6L and 6R, for example, resistance welding, laser welding, or the like is used. As an example, connection relationship is provided in which 5 battery cells 1, which are connected in parallel, are connected in series 10 times. Such a connection relationship is called 5P (parallel)

10S (series). It is possible to use other connection relationships. Although the connection plates 6L and 6R which are obtained through division are used in the embodiment, the shape thereof is not limited to the plate shape and a plurality of belt-like metallic plates may be used.

When the battery cells 1 which are stored in the cell holders 2L and 2R adhere to the connection plates 6L and 6R, a plurality of insulating cushions 7L and 7R are used. A rubber-based material, such as silicon, isoprene rubber, butadiene rubber, styrene rubber, butyl rubber, ethylene prolene rubber, or the like is used for the insulating cushions 7L and 7R. The material is not limited to the rubber-based material if the material has elasticity and is transformed by pressure.

Each of the insulating cushions 7L and 7R includes openings which are formed to correspond to the positive electrode terminals of the five battery cells 1 which are arranged in the longitudinal direction in an aggregation of the battery cells 1. The positive electrode terminals adhere to the terminal contact parts of the connection plates 6L and 6R through the openings. Each of the insulating cushions 7L and 7R is pressed and sandwiched between an end surface in the vicinity of the positive electrode terminal parts of the battery cells 1 and the inner surface of each of the connection plates 6L and 6R (is supported to be held).

The battery cells 1 correspond to, for example, a cylindrical lithium-ion secondary battery. In the structure of this type of battery, a metallic cylindrical battery container, in which one end surface (negative electrode) side is blocked and the other end surface (positive electrode) side is open, is used. Therefore, moisture does not penetrate to the inside from the negative electrode sides of the battery cells 1 but there is a possibility that moisture penetrates from the positive electrode sides. Therefore, the insulating cushions 7L and 7R are arranged on only the positive electrode sides. Further, since the insulating cushions 7L and 7R have elasticity, there is an advantage in that external impact is absorbed.

As described above, in a state in which the battery cells 1, the cell holders 2L and 2R, the connection plates 6L and 6R, and the insulating cushions 7L and 7R are assembled, a printed circuit board 8 is attached to, for example, the upper portion of the cell holder 2L by screws. In the embodiment, the length of the cell storage unit 3R of the cell holder 2R is shorter than the length of the cell storage unit 3L of the cell holder 2L. If the printed circuit board 8 is laid across and fixed to the two cell holders 2L and 2R, there is a possibility that the printed circuit board 9 is unstably attached, and thus the printed circuit board 8 is attached on the upper surface of the longer cell storage unit 3L.

A control circuit which controls the charge and discharge of the plurality of battery cells 1, a circuit which protects the battery cells 1, a circuit which controls a display LED, and the like are mounted on the printed circuit board 8. Further, the battery cells 1 are connected to the printed circuit board 8 through the connection plates 6L and 6R. Further, although not shown in the drawing, a lead wiring is derived from the printed circuit board 8, and the lead wiring is connected to an output connector (not shown in the drawing).

Although not shown in FIG. 1, the printed circuit board 8 is coated with an insulating sheet. Further, the battery block 50 is configured with the battery cells 1, the cell holders 2L and 2R, the connection plates 6L and 6R, the insulating cushions 7L and 7R, and the printed circuit board 8, which are in an assembled state. The battery block 50 is inserted to a waterproof pouch as necessary, and an upper-side exterior casing and a lower-side exterior casing, which are manufactured from the upper side and the lower side of the battery block 50 through resin molding, are joined.

Figure 2:
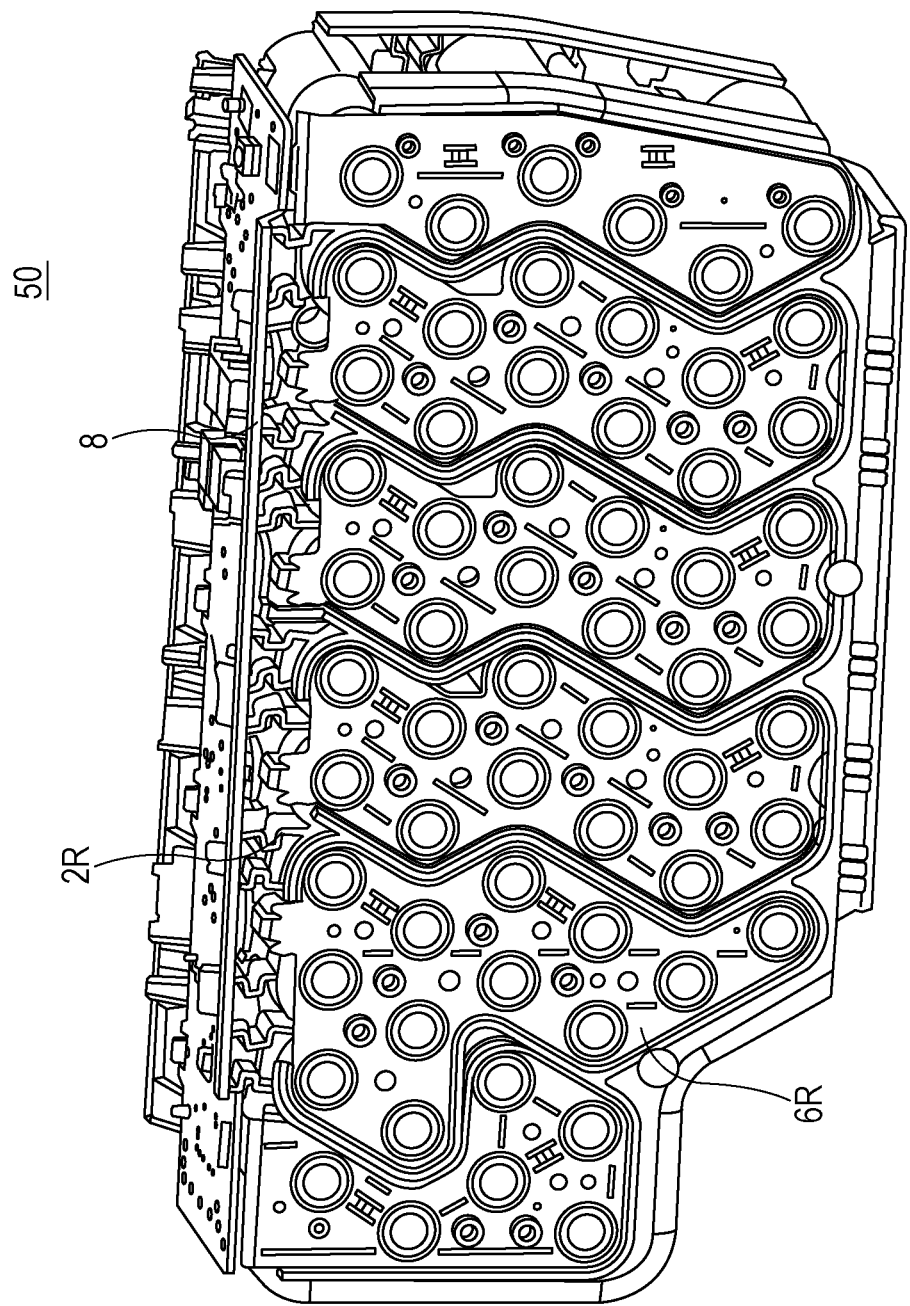
FIG. 2 is a perspective view illustrating the battery block.
Figure 3:
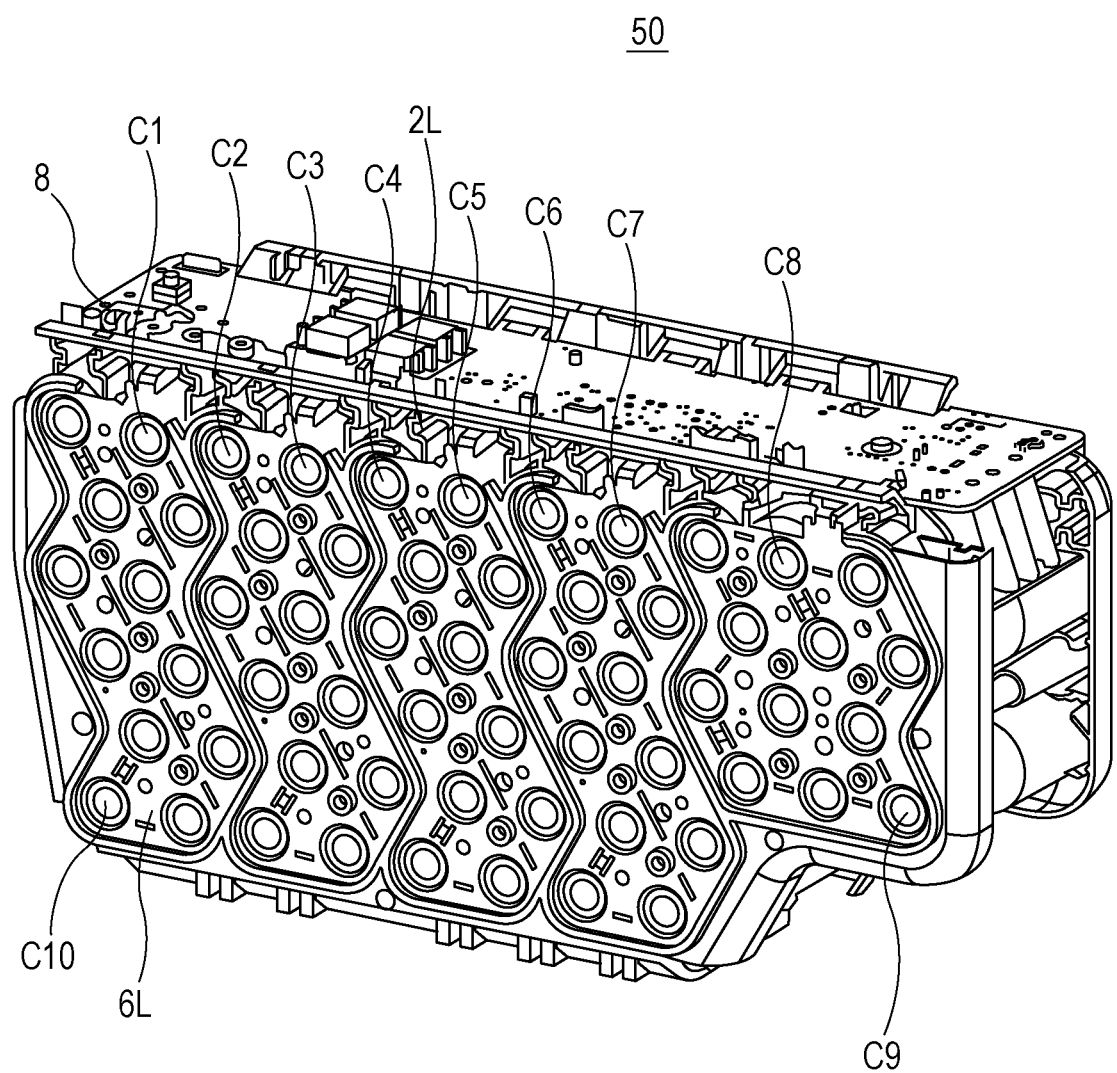
FIG. 3 is a perspective view illustrating the battery block.

FIG. 2 is a perspective view illustrating the battery block 50 viewed from the side of the connection plate 6R, and FIG. 3 is a perspective view illustrating the battery block 50 viewed from the side of the connection plate 6L. As shown in FIGS. 2 and 3, each of the cell holders 2L and 2R is configured such that 60 battery cells 1 can be stored. That is, a configuration of 6P10S can be provided. In the 60 battery cells, it is possible to provide a configuration of 50 battery cells (5P10S) excepting 10 battery cells indicated by C1 to C10 in FIG. 3. For example, 6 (or 5) battery cells, which are arranged in zigzag in the vertical direction, are connected in parallel in the laminated battery cells 1.

Figure 4:
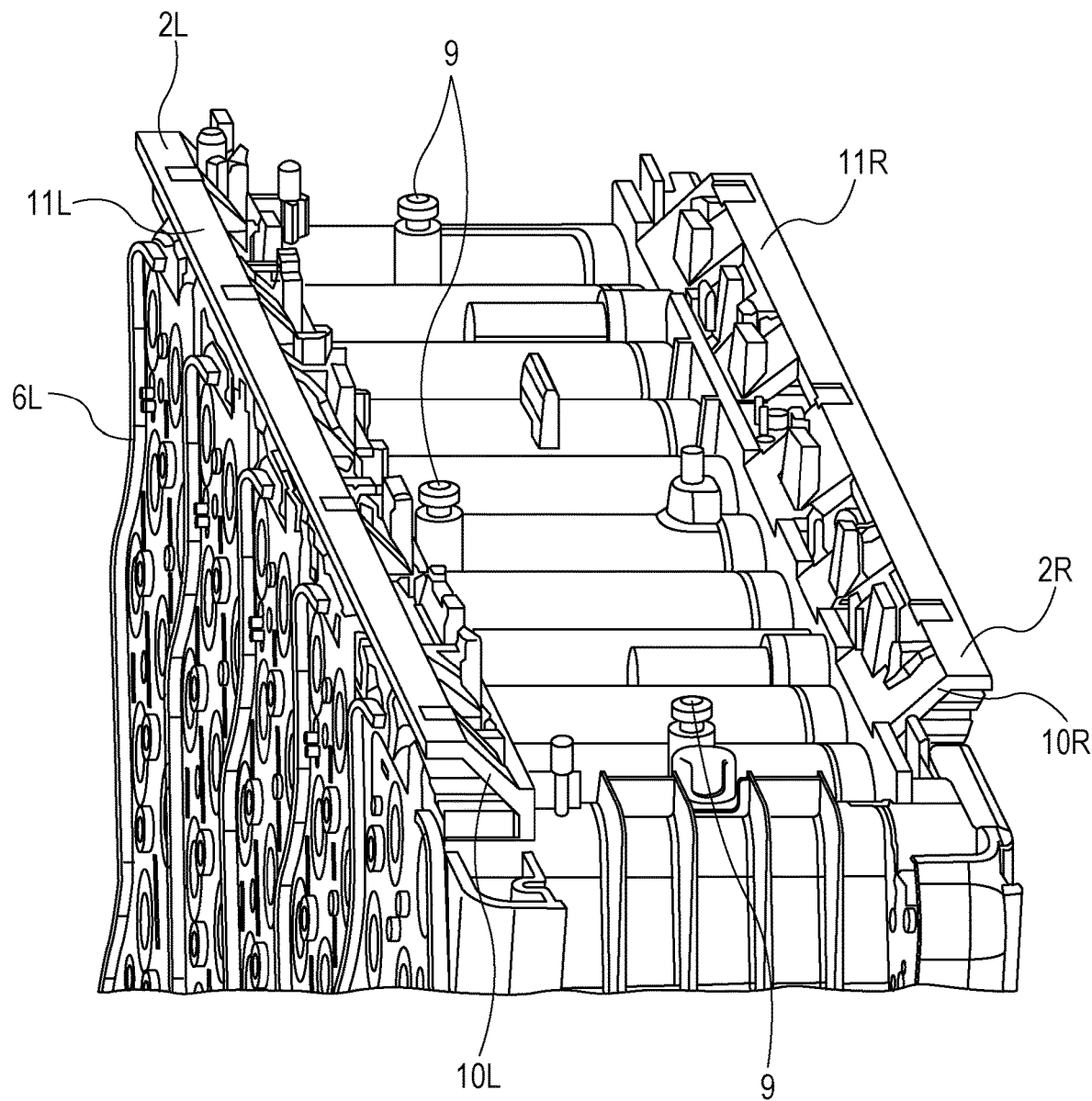
FIG. 4 is a partial perspective view before a printed circuit board for the battery block is attached.
Figure 5:
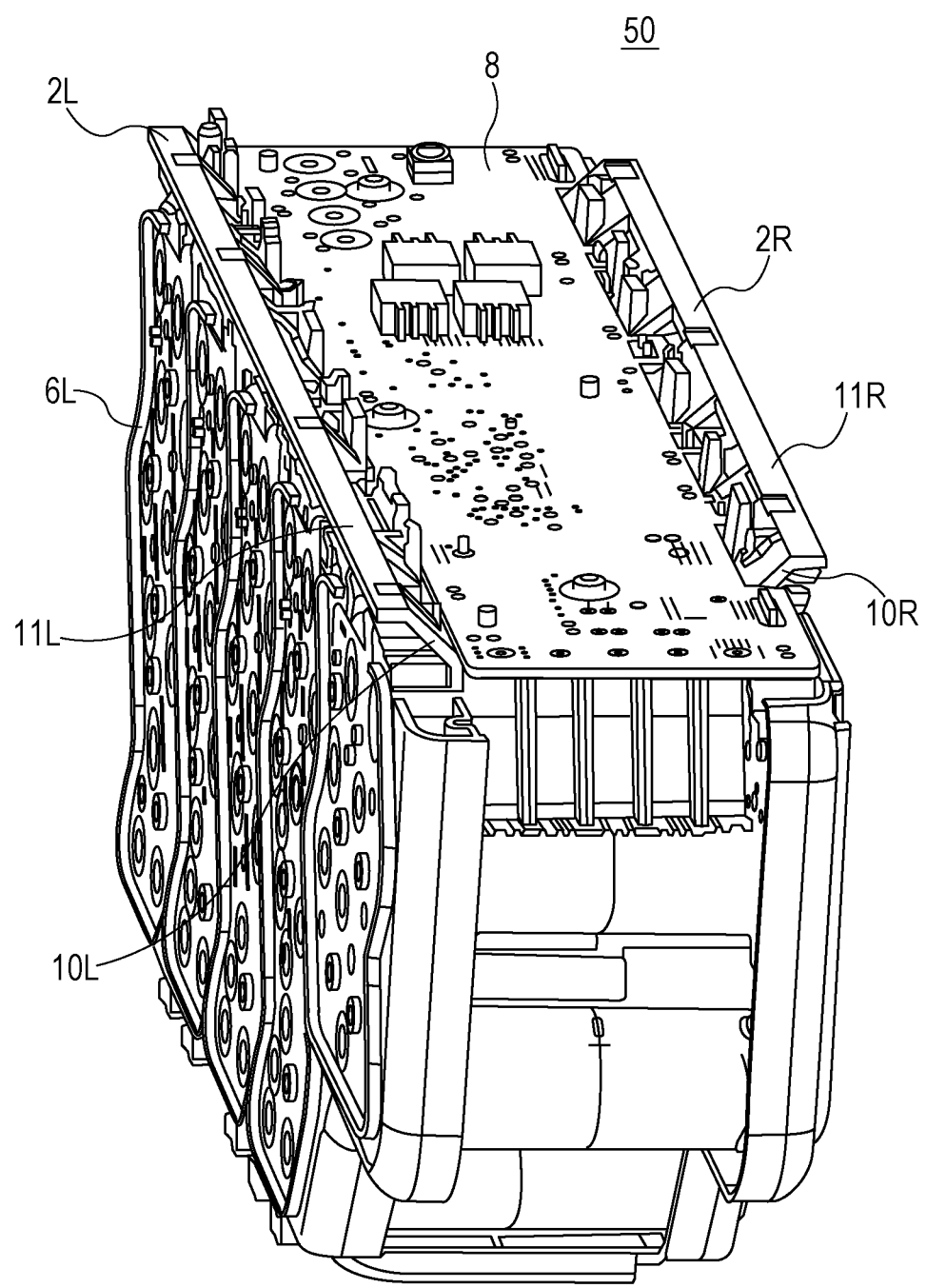
FIG. 5 is a perspective view after the printed circuit board of the battery block is attached.

Further, FIG. 4 illustrates the upper portion of the battery block 50 in a state in which the printed circuit board 8 is not attached and FIG. 5 illustrates the battery block 50 in a state in which the printed circuit board 8 is attached. A plurality of protrusions 9 are provided in the substrate attachment positions of the cell holder 2L in order to support a substrate. Further, tilted plates 10L and 10R and casing support plates 11L and 11R are integrally formed with the cell holders 2L and 2R along both sides of the printed circuit board 8 in order to secure an installation space for the printed circuit board 8. The surfaces of the casing support plates 11L and 11R which are parallel to the surface of the printed circuit board 8 correspond to the inner surface side of the exterior casing. Therefore, an attachment space for the printed circuit board 8 is secured between the inner surface side of the exterior casing and the cell holders 2L and 2R. Further, impact applied to the exterior casing is relieved by the tilted plates 10L and 10R and the support plates 11L and 11R, and thus it is possible to prevent impact from being propagated to the battery cells 1.

[Attachment of Connection Plates on Cell Holders]

Figure 6:
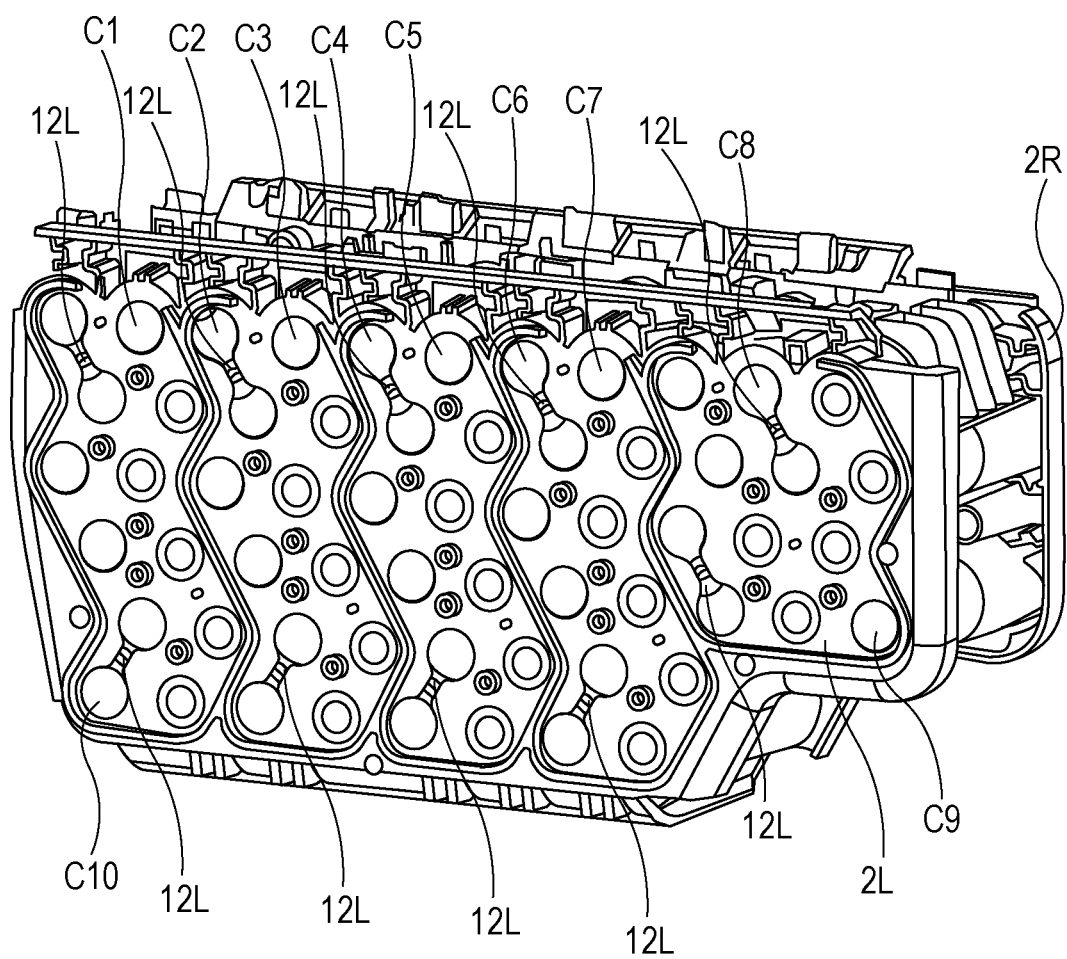
FIG. 6 is a perspective view illustrating the battery block before connection plates are attached.
Figure 7:
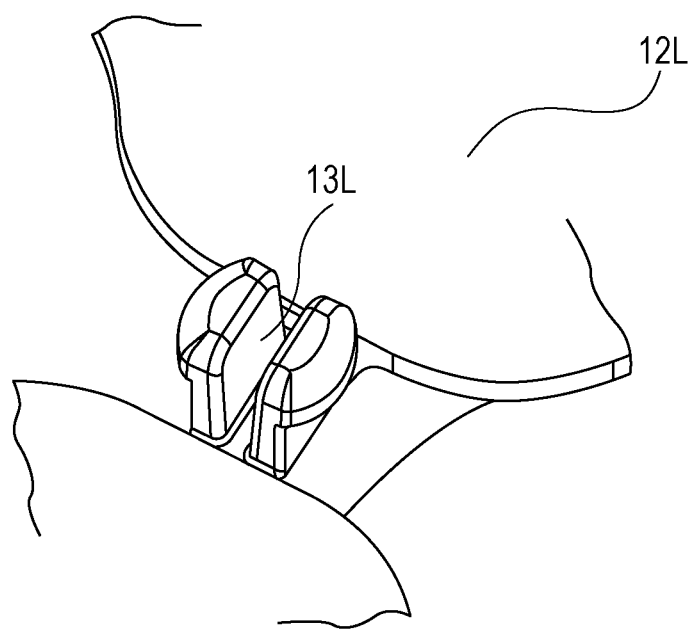
FIG. 7 is a perspective view illustrating a projection part used for attachment through snap-fit.

The attachment of the connection plates 6L and 6R to the cell holders 2L and 2R will be described with reference to FIGS. 6 to 10. FIG. 6 illustrates the cell holders 2L and 2R in a state in which the connection plates are not attached. As described with reference to FIG. 3, 10 battery cells C1 to C10 are extracted from 60 battery cells in the configuration of 5P10S.

A plurality of projection parts 12L are integrally provided with the cell holder 2L in order to attach the connection plates 6L and 6R through snap fits. Likewise, the cell holder 2R is provided with projection parts 12R. For example, two projection parts 12L and 12R are formed in order to be attached to the connection plates 6L and 6R obtained through division. Each of the projection parts 12L has a shape which is enlarged and shown in FIG. 7. The projection part 12L is configured such that a slit 13L is formed in a cylindrical center portion and two leading ends can be bent with elasticity. Further, steps are formed at the bottoms of the leading ends. Each projection part 12R has the same shape. Further, a plurality of bosses are formed on the surfaces of the cell holders 2L and 2R. The bosses come into contact with the inner surface of the exterior casing.

The projection parts 12L and 12R are provided on the negative electrode sides of the battery cells 1 of the cell holders 2L and 2R. Since the projection parts 12L and 12R are integrally formed with the cell holders 2L and 2R through resin molding and steps are formed at the bottoms of the leading ends, openings are generated around the projection parts 12L and 12R due to a molding reason. There is a possibility that moisture penetrates to the inner sides of the cell holders 2L and 2R through the openings. As described above, since there is a strong possibility that moisture penetrates to the positive electrode sides of the battery cells 1 compared to the negative electrode sides, the projection parts 12L and 12R are provided in negative electrode-side arrangement regions.

Figure 8:
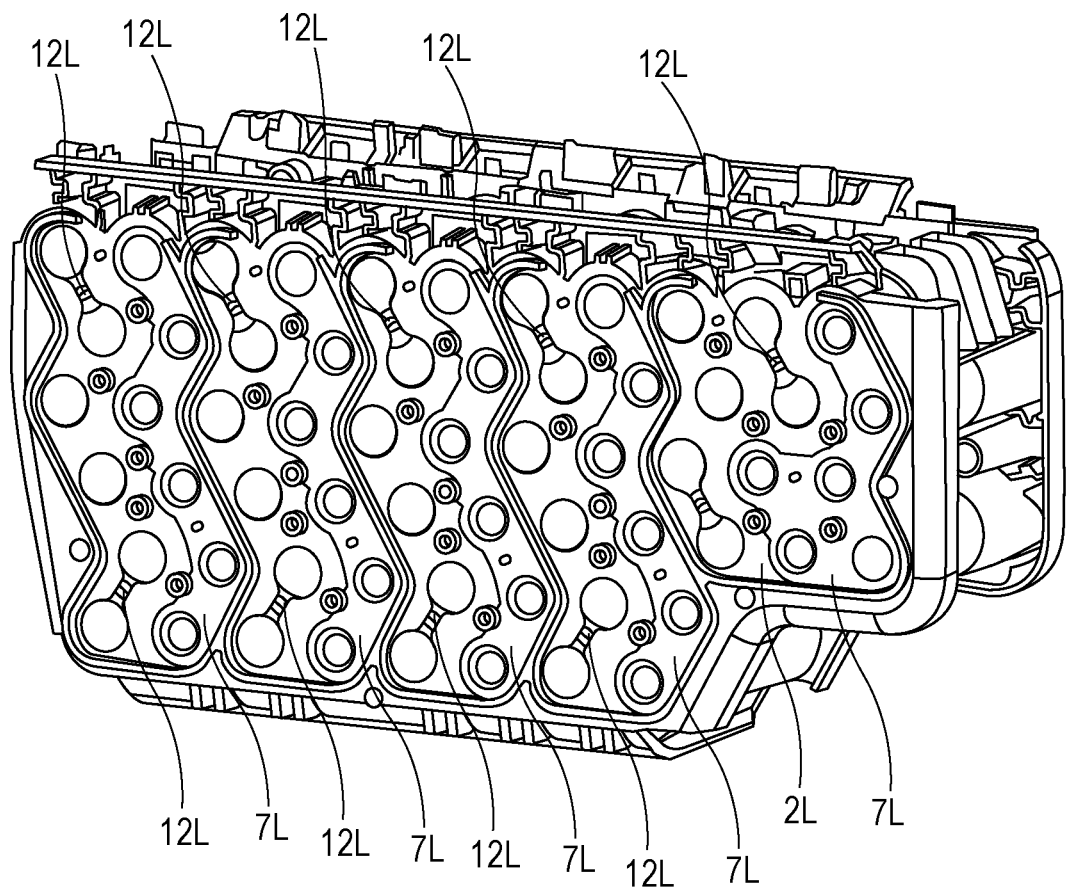
FIG. 8 is a perspective view illustrating a state in which insulating cushions are attached.

In FIGS. 6 and 8, the positive electrodes or the negative electrodes of the 5 (or 6) battery cells 1 are arranged together in a region which extends in zigzag in the vertical direction. The arrangement region on the positive electrode-side or the negative electrode-side is a strip-shaped region which extends in zigzag. In the drawings, the end surfaces of the battery cells 1 which are shown by double circles are positive electrode sides. On the other hand, the insulating cushions 7L and 7R are arranged in positive electrode-side arrangement regions. As described above, the insulating cushions 7L and 7R include functions of waterproof and impact absorption.

Figure 9:
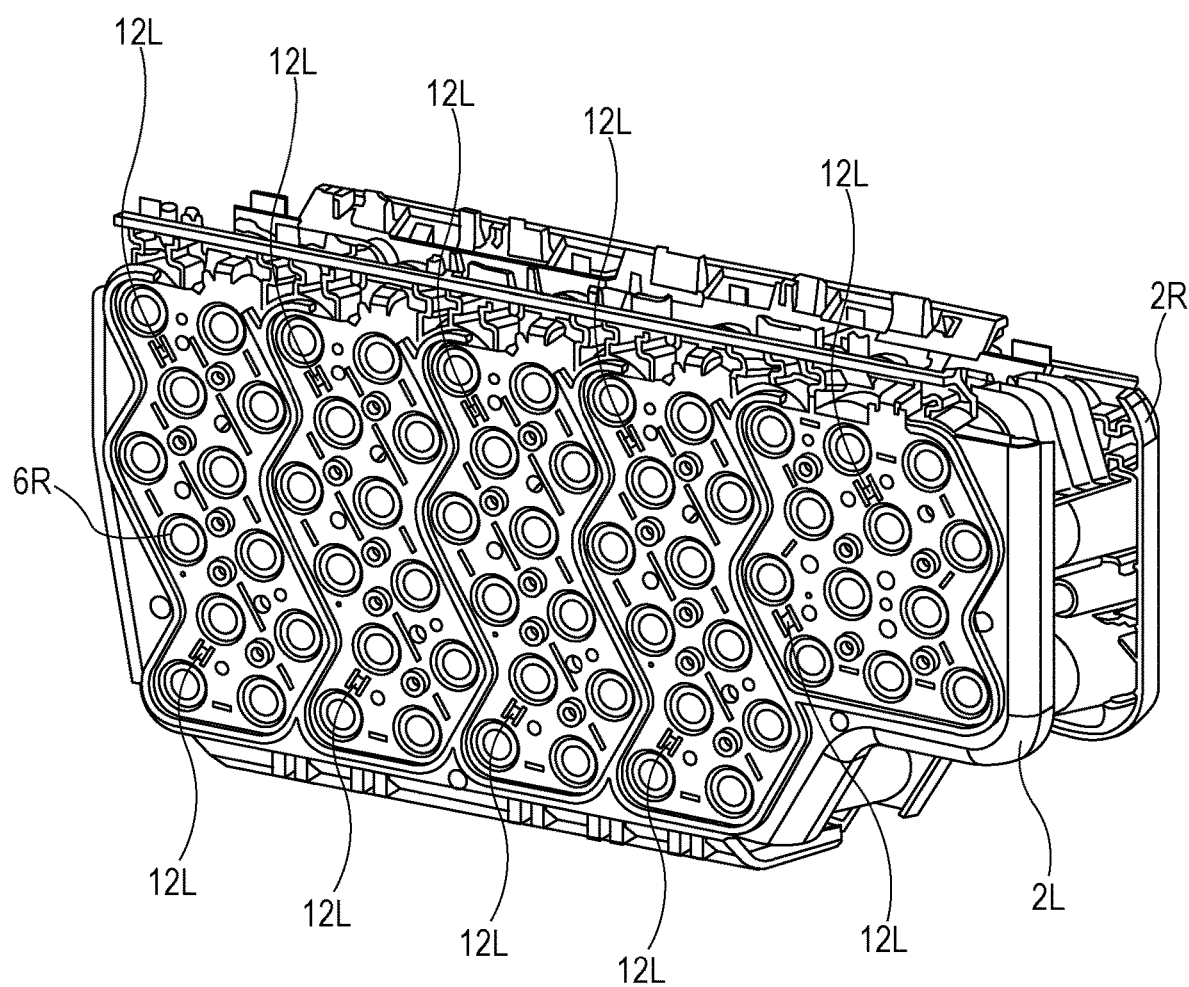
FIG. 9 is a perspective view illustrating the battery block in a state in which the connection plates are attached.

Further, as shown in FIG. 9, the projection parts 12L and 12R of the cell holders 2L and 2R penetrate through holes which are formed in the connection plates 6L and 6R, and the connection plates 6L and 6R are stuck on the steps of the projection parts 12L and 12R. It is possible to fix the connection plates 6L and 6R through the snap fits. Therefore, it is possible to prevent the connection plates 6L and 6R from moving before welding is performed, and it is possible to prevent short-circuit from being generated because the connection plates 6L and 6R are deviated when an assembly operation is performed. Further, it is possible to prevent the battery cells, which are welded in the connection plates 6L and 6R, from moving by fixing the connection plates 6L and 6R, and it is possible to improve the impact resistance of the battery cells. Further, since it is possible to fix the cell holders 2L and 2R to the connection plates 6L and 6R, it is possible to arrange and fix the insulating cushions 7L and 7R.

Figure 10:
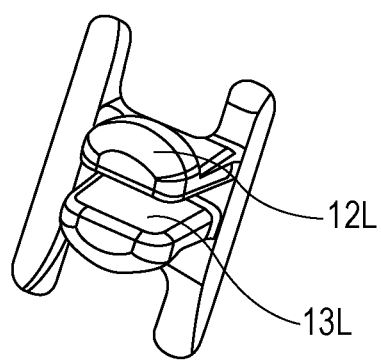
FIG. 10 is a perspective view illustrating another example of the snap-fit.

The shape of the holes provided in the connection plates 6L and 6R into which the projection parts 12L and 12R are inserted is not limited to the circular shape and may be an H-shape as shown in FIG. 10. Although the fixing power between each of the cell holders 2L and 2R and each of the connection plates 6L and 6R is weak in a configuration in FIG. 10, it is easy to attach each of the connection plates 6L and 6R to each of the cell holders 2L and 2R. That is, holes which have easily bendable shapes are formed in the connection plates 6L and 6R by only bending the projection parts 12L and 12R without mounting the connection plates 6L and 6R.

[Impact Relaxation Ribs]

Figure 11A:
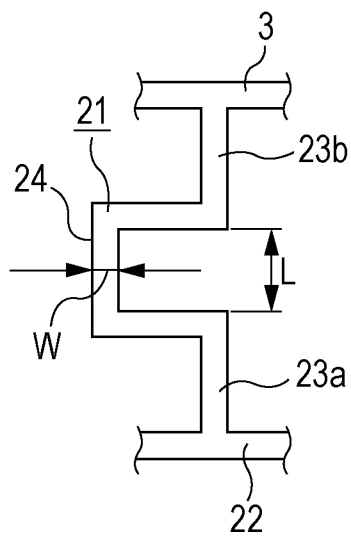
FIG. 11A is a plan view illustrating impact relaxation rib and an example of the impact relaxation rib.

Impact relaxation ribs are provided in the outer circumference of each of the cell holders 2L and 2R in order to relieve impact which is applied to the battery pack from the outside. The impact relaxation ribs will be described with reference to FIGS. 11A to 11F. As shown in FIG. 11A, an impact relaxation rib 21 is integrally molded with the cell holder 2L or 2R between the peripheral wall 22 of the cell holder 2L or 2R and a cell storage unit 3. That is, the peripheral wall 22 is connected to a U-shaped or an inverted U-shaped curved section 24 by a connection section 23a, and the curved section 24 is connected to the cell storage unit 3 by a connection section 23b.

Figure 11B:
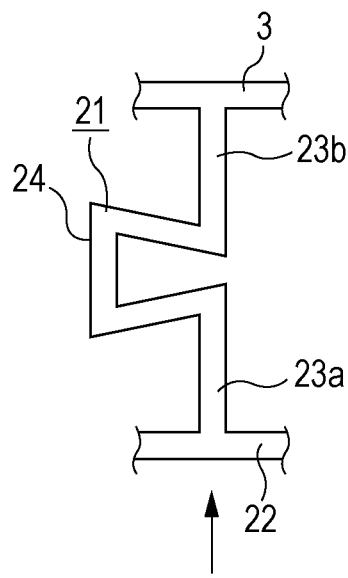
FIG. 11B is a plan view illustrating impact relaxation rib and an example of the impact relaxation rib.
Figure 11C:
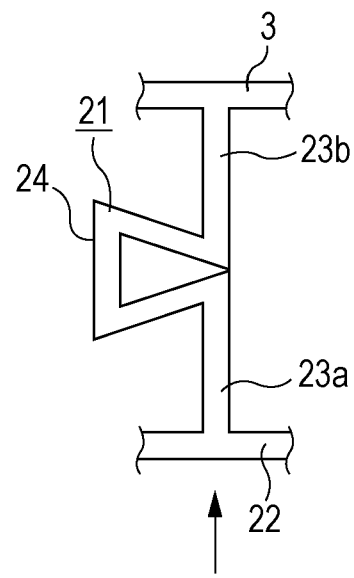
FIG. 11C is a plan view illustrating impact relaxation rib and an example of the impact relaxation rib.

If force is applied to the peripheral wall 22 in the direction facing the inner side as indicated by an arrow in FIG. 11B, the curved section 24 of the impact relaxation rib 21 is transformed in an elastic region, and thus force which is applied to the cell storage unit 3 is relieved (dispersed). As a result, the battery cell 1 which is stored in the cell storage unit 3 is protected. If further greater force is applied to the peripheral wall 22 in the direction facing the inner side as indicated by an arrow in FIG. 11C, the transformation amount of the curved section 24 increases. As a result, the up and down rib sections of the opening of the curved section 24 collide with each other, and the transformation amount is limited.

As above, the impact relaxation rib 21 can define the transformation amount depending on the width L of the opening of the curved section 24. Therefore, it is possible to define the change amount of elastic transformation depending on previously estimated impact, for example, impact when being dropped from a predetermined height. Further, force to generate transformation changes depending on the width W of the rib of the impact relaxation rib 21. If the width W is great, it is difficult to transform the impact relaxation rib 21. Therefore, it is possible to set the width W of the rib of the impact relaxation rib 21 depending on the previously estimated impact. For example, it is possible to form an impact relaxation rib which includes an optimal width depending on the weight of the battery pack.

Figure 11D:
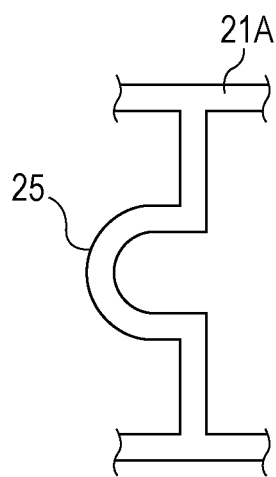
FIG. 11D is a plan view illustrating impact relaxation rib and an example of the impact relaxation rib.
Figure 11E:
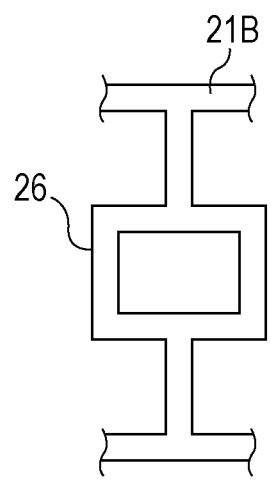
FIG. 11E is a plan view illustrating impact relaxation rib and an example of the impact relaxation rib.
Figure 11F:
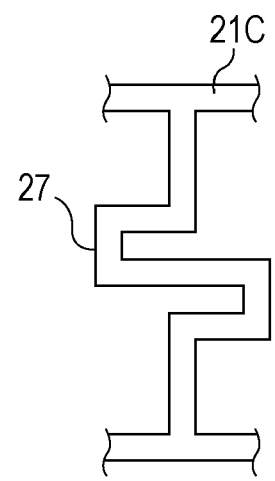
FIG. 11F is a plan view illustrating impact relaxation rib and an example of the impact relaxation rib.

In addition to the impact relaxation rib 21 shown in FIG. 11A, an impact relaxation rib 21A which includes a semi-circular curved section 25 as shown in FIG. 11D may be used. Further, an impact relaxation rib 21B which includes a square frame-shaped curved section 26 as shown in FIG. 11E may be used. Further, an impact relaxation rib 21C which includes a bended curved section 27 as shown in FIG. 11F may be used.

[Cell Holder]

Figure 12:
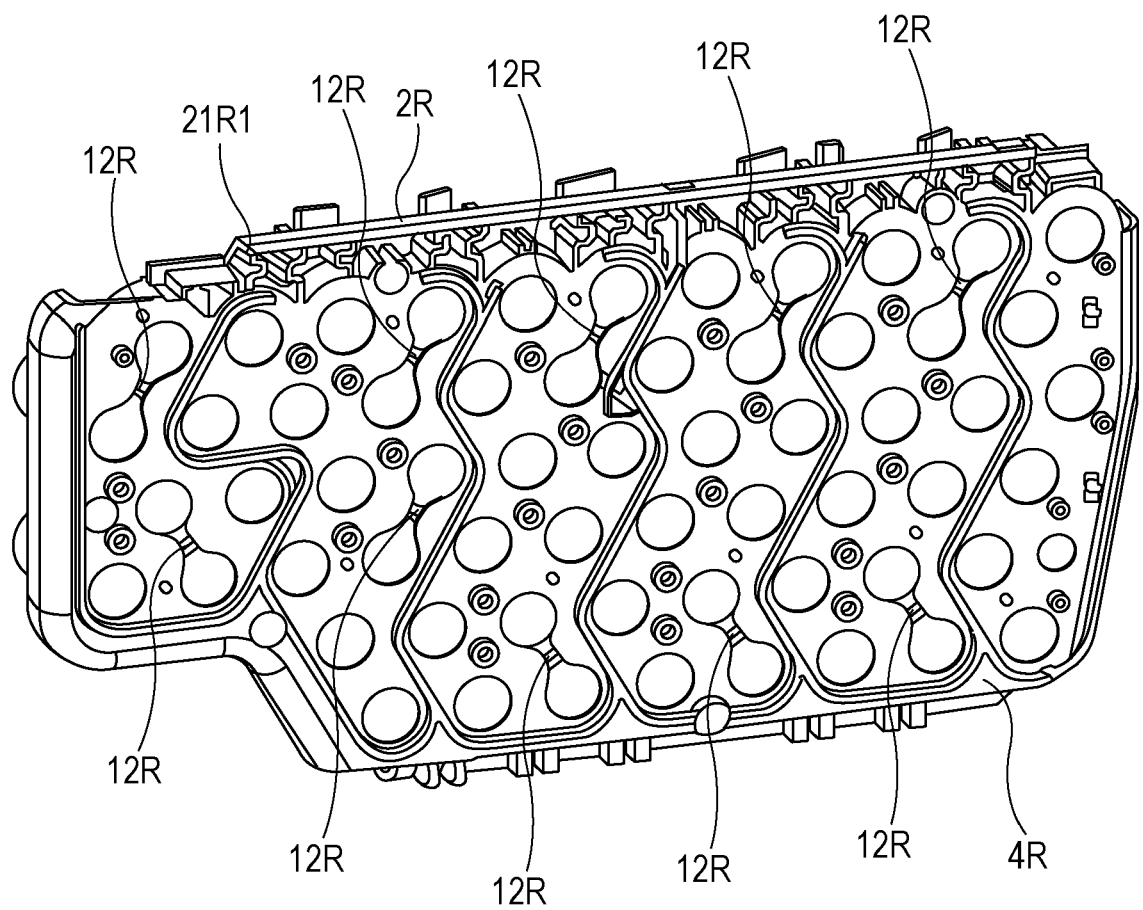
FIG. 12 is a perspective view illustrating the exterior surface of one-side cell holder.
Figure 13:
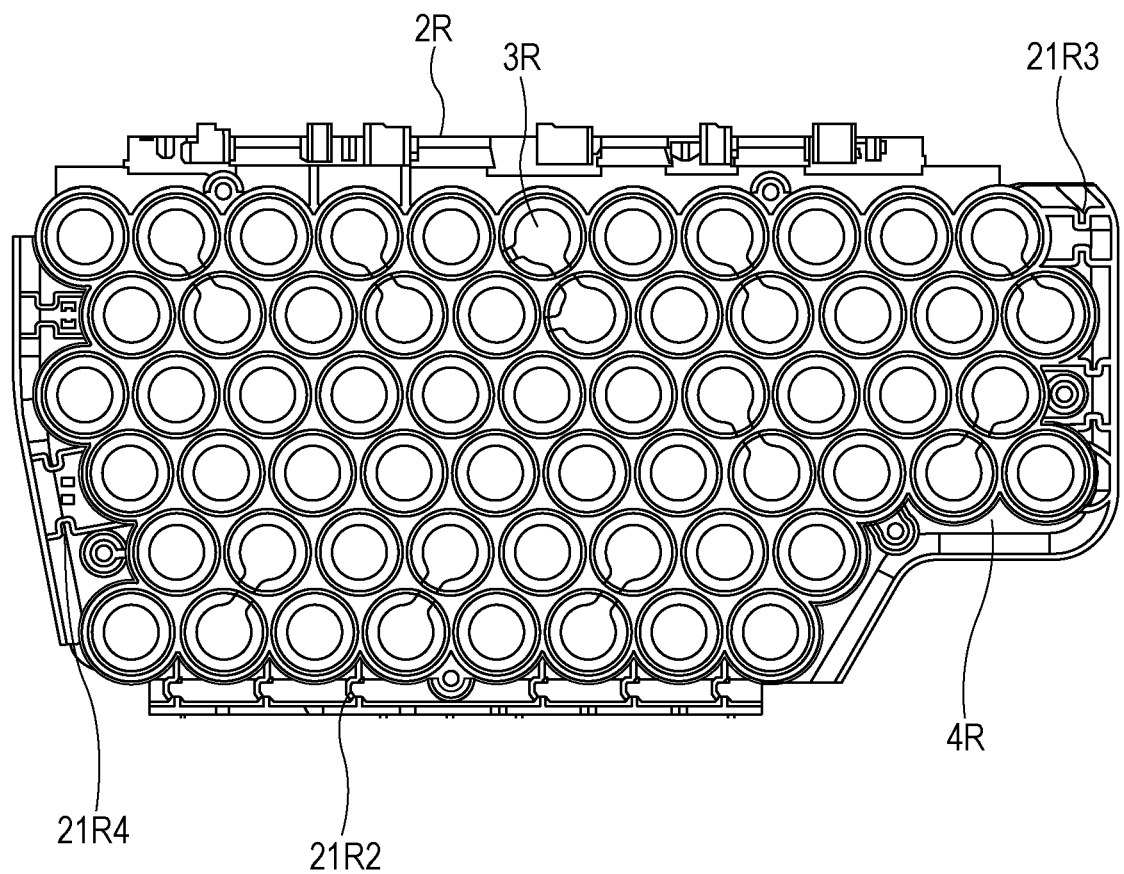
FIG. 13 is a perspective view illustrating the inner surface of the one-side cell holder.

The cell holders, with which the above-described impact relaxation ribs 21 are integrally molded, will be described. FIG. 12 is a perspective view illustrating the exterior surface of the cell holder 2R, and FIG. 13 is a perspective view illustrating the inner surface of the cell holder 2R. In the inner surface of the cell holder 2R, 60 cell storage units 3R which store the respective 60 battery cells 1 are provided in the base unit 4R. In FIG. 13, in order to avoid complication, reference numeral 3R is attached to a single cell storage unit. In the exterior surface of the cell holder 2R, the projection parts 12R are provided to fix the connection plate 6R through snap fits. Further, ribs, which define the attachment positions of the connection plates 6R obtained through division and which insulate the connection plates, are formed. Further, the bosses which support the connection plates 6R are formed.

The impact relaxation ribs are integrally formed with the cell holder 2R in the outer circumference of the cell holder 2R. That is, a plurality of impact relaxation ribs 21R1 are formed on the upper side of the exterior surface of the cell holder 2R as shown in FIG. 12. Meanwhile, in FIG. 12, a reference numeral 21R1 is attached to a single impact relaxation rib in order to avoid complication.

A plurality of impact relaxation ribs 21R2 are formed on the bottom of the inner surface of the cell holder 2R as shown in FIG. 13. A plurality of impact relaxation ribs 21R3 are formed on the foreside of the inner surface of the cell holder 2R. A plurality of impact relaxation ribs 21R4 are formed on the back side of the inner surface of the cell holder 2R. Meanwhile, in FIG. 13, reference numerals 21R2, 21R3, and 21R4 are attached to single impact relaxation ribs in order to avoid complication.

Figure 14:
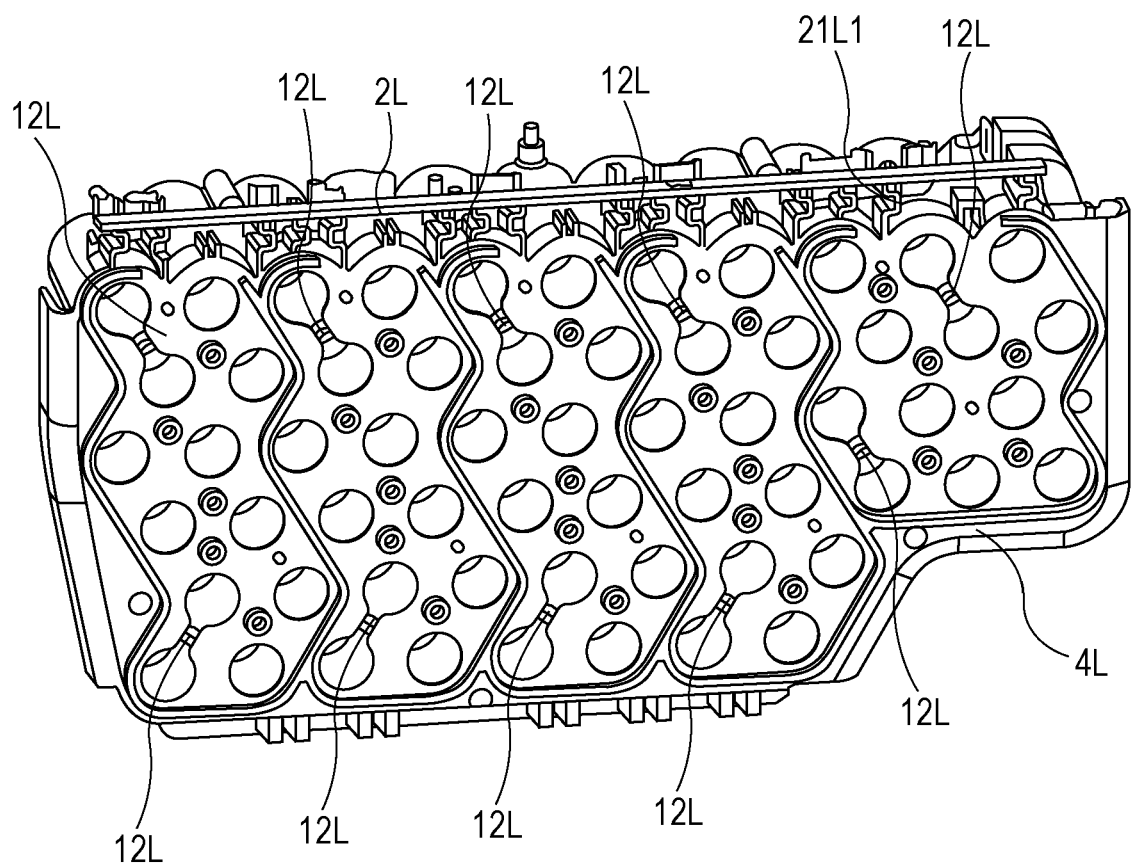
FIG. 14 is a perspective view illustrating the exterior surface of the other-side cell holder.
Figure 15:
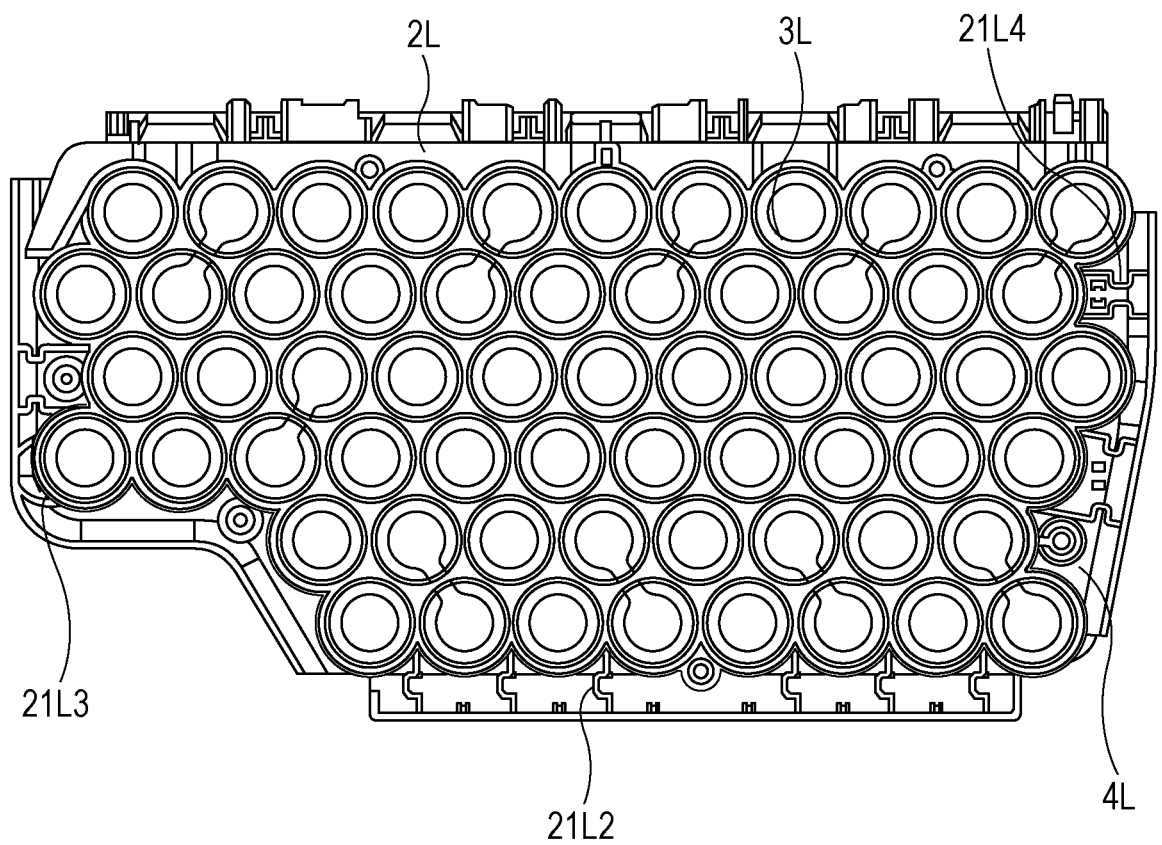
FIG. 15 is perspective view illustrating the inner surface of the other-side cell holder.
Figure 16:
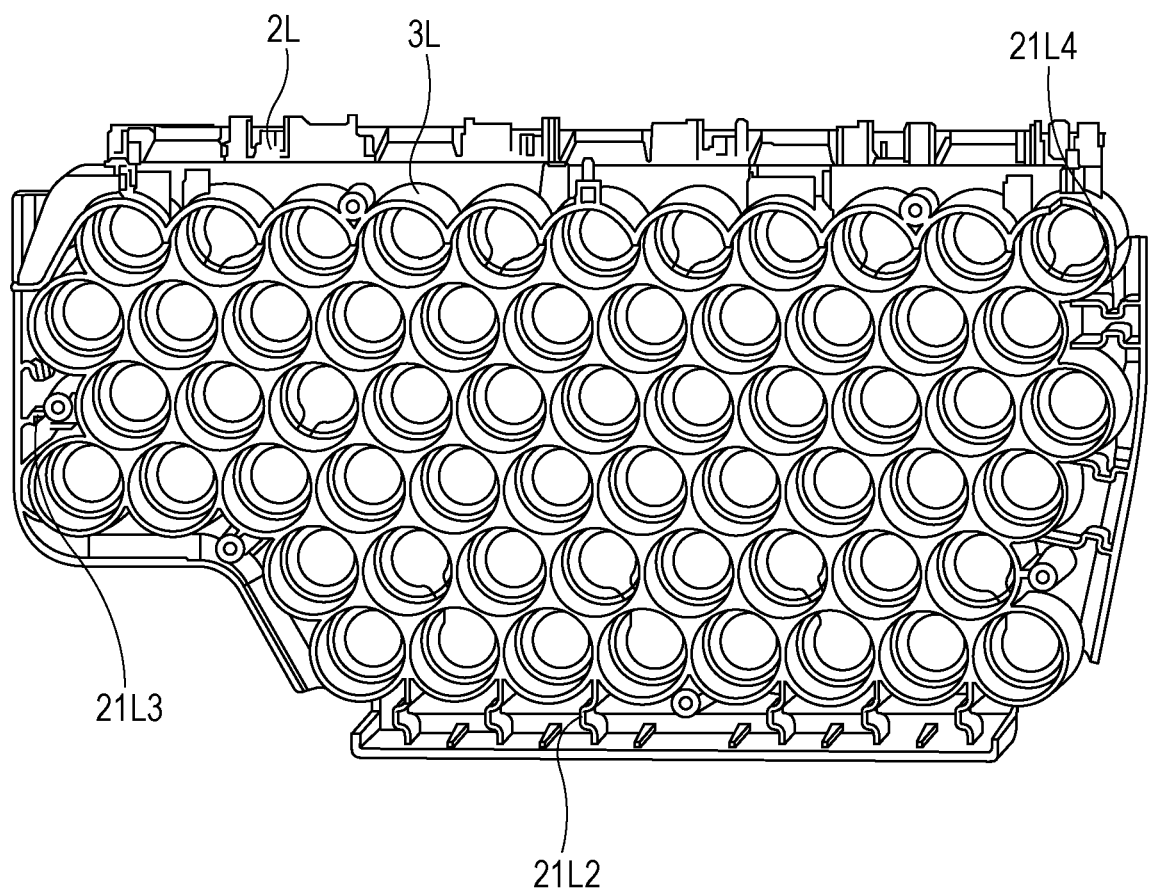
FIG. 16 is a perspective view illustrating the inner surface of the other-side cell holder.

FIG. 14 is a perspective view illustrating the exterior surface of the cell holder 2L, and FIGS. 15 and 16 are perspective views illustrating the inner surface of the cell holder 2L. In the inner surface of the cell holder 2L, 60 cell storage units 3L which store the respective 60 battery cells 1 are provided on the base unit 4L. In FIG. 15, in order to avoid complication, reference numeral 3L is attached to a single cell storage unit. In the exterior surface of the cell holder 2L, the projection parts 12L are provided to fix the connection plate 6L through snap fits. Further, the ribs which define the attachment position of the connection plates 6L obtained through division and which insulate the connection plates are formed. Further, bosses which support the connection plates 6L are formed.

The impact relaxation ribs are integrally formed with the cell holder 2L along the outer circumference of the cell holder 2L. That is, a plurality of impact relaxation ribs 21L1 are formed on the upper side of the exterior surface of the cell holder 2L as shown in FIG. 14. Meanwhile, in FIG. 14, reference numeral 21L1 is attached to a single impact relaxation rib in order to avoid complication.

A plurality of impact relaxation ribs 21L2 are formed at the bottom of the inner surface of the cell holder 2L as shown in FIGS. 15 and 16. A plurality of impact relaxation ribs 21L3 are formed on the foreside of the inner surface of the cell holder 2L. A plurality of impact relaxation ribs 21L4 are formed in the back side of the inner surface of the cell holder 2L. Meanwhile, in FIGS. 15 and 16, reference numerals 21L2, 21L3, and 21L4 are attached to single impact relaxation ribs in order to avoid complication.

Figure 17:
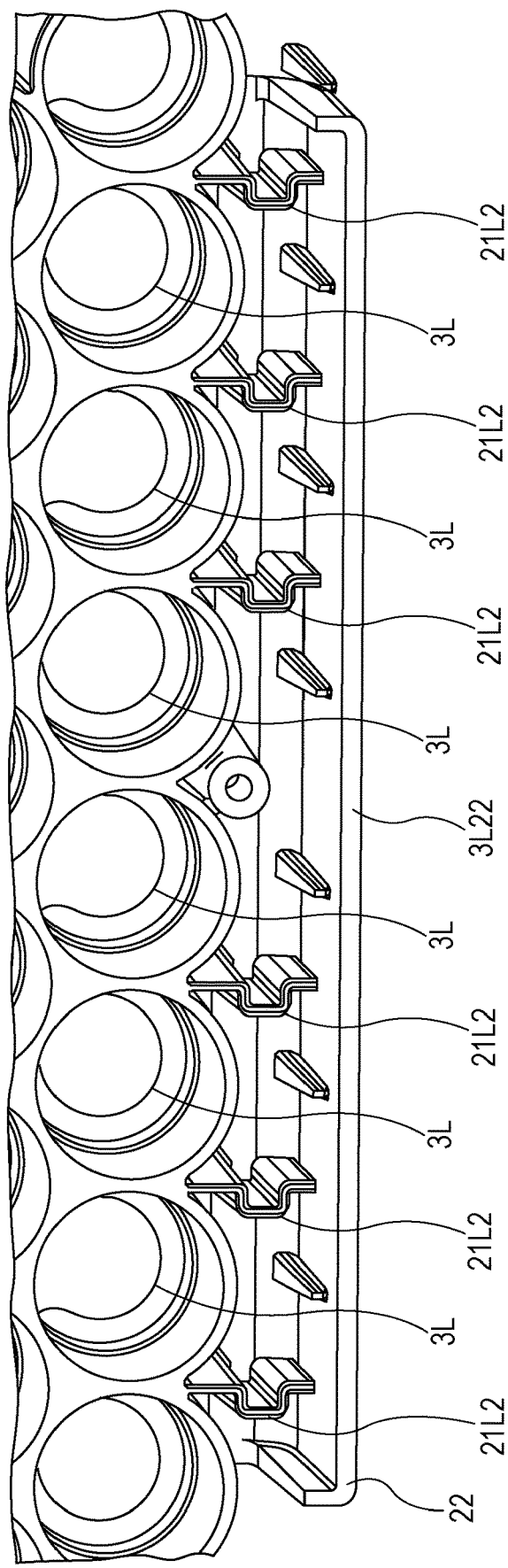
FIG. 17 is a perspective view enlarging and illustrating a part of the bottom of the other-side cell holder.

A part of the outer circumference of the bottom of the cell holder 2L is enlarged and shown in FIG. 17. The cylindrical cell storage units 3L are arranged in the horizontal direction. The impact relaxation ribs 21L2 are formed in the boundaries of adjacent cell storage units 3L. That is, each of the impact relaxation ribs 21L2 is formed between the base of the valley of the surfaces of the cell storage units 3L and the peripheral wall 22. Therefore, when external impact is applied, the force is applied to the positions of the valleys of the cell storage units 3L, and thus it is possible to reduce the degree of the propagation of the impact to the inner battery cells. However, the impact relaxation ribs 21L2 may be formed in positions other than the valleys in order to increase the number of impact relaxation ribs 21L2.

Figure 18:
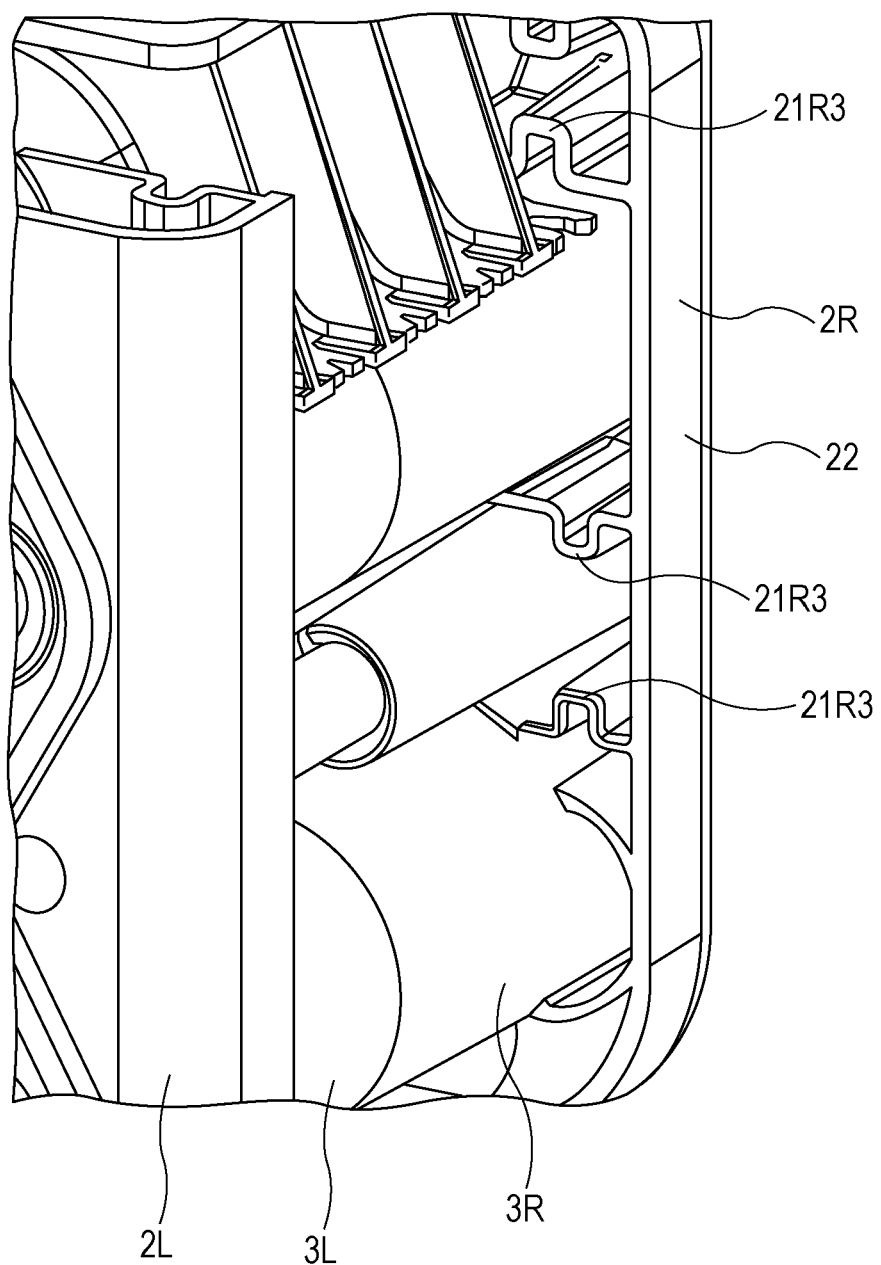
FIG. 18 is a perspective view enlarging and illustrating a part of the foreside of the battery block.

A part of the foreside of the battery block 50 is enlarged and shown in FIG. 18. The impact relaxation rib 21R3 is formed between adjacent cell storage units 3R. That is, the impact relaxation rib 21R3 is formed between the base of the valley of the surfaces of the cell storage units 3R and the peripheral wall 22. Therefore, when external impact is applied, the force is applied to the positions of the valleys of the cell storage units 3R, and thus it is possible to suppress the degree of the propagation of the impact for the inner battery cells. However, the impact relaxation ribs 21R3 may be formed in positions other than the valleys in order to increase the number of impact relaxation ribs 21R3.

Meanwhile, the reason that the impact relaxation ribs 21R1 and 21L1 are provided on the exterior surface of the upper portion of each of the cell holders 2R and 2L is not to interrupt when the printed circuit board 8 is arranged on the upper side, and to effectively relieve impact which is applied from the upper portions.

Figure 19:
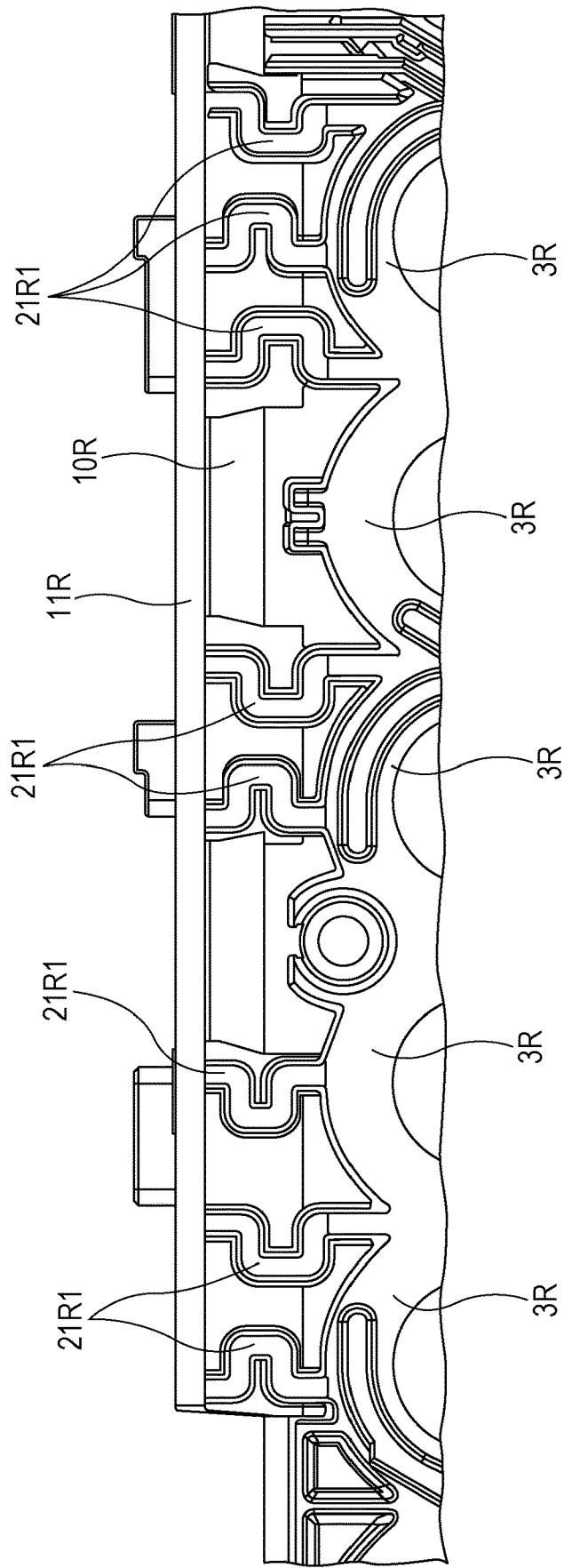
FIG. 19 is a perspective view enlarging and illustrating a part of the upper side of the one-side cell holder.
Figure 20:
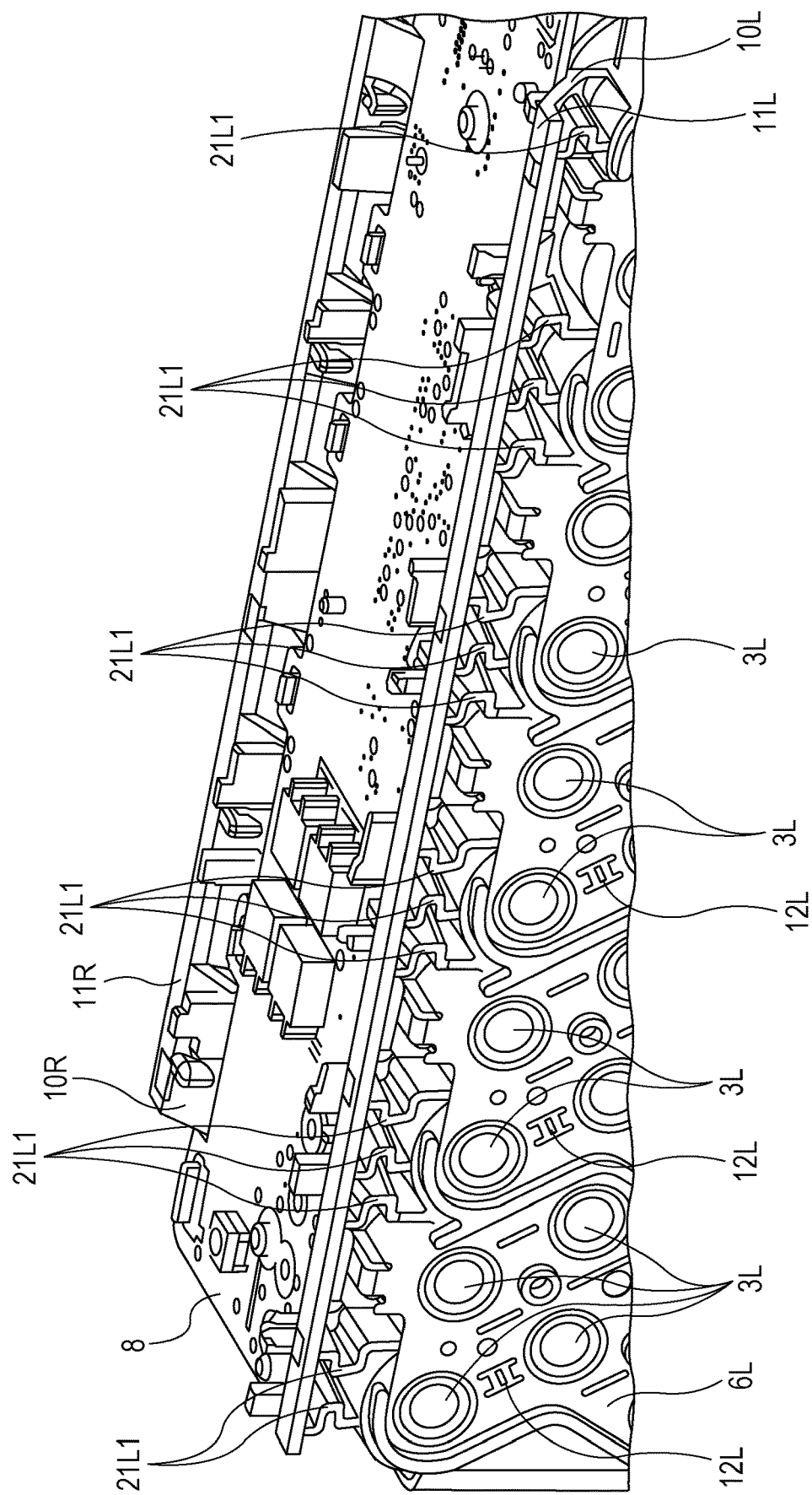
FIG. 20 is a perspective view enlarging and illustrating a part of the upper side of the battery block.

FIGS. 19 and 20 are enlarged views illustrating impact relaxation ribs on the upper side of the battery block. FIG. 19 enlarges and shows the upper side of the vicinity of the foreside of the battery block. As also shown in FIG. 4, a tilted plate 10R and a casing support plate 11R are formed on the upper side in order to secure the attachment space for the printed circuit board 8. The impact relaxation rib 21R1 is arranged between the lower surface of the casing support plate 11R and the surface of the cell storage unit 3R.

Therefore, if external impact is applied to the casing support plate 11R through the exterior casing, the impact relaxation rib 21R1 is elastically transformed as described above, the tilted plate 10R is also elastically transformed, and thus the impact is relieved by the impact relaxation ribs 21R1 and the tilted plate 10R.

As shown in FIG. 20, the impact relaxation rib 21L1 which is on the upper side of the cell holder 2L is provided between the lower surface of the casing support plate 11L and the cell storage unit 3L. Therefore, like the cell holder 2R, the impact applied from the upper side to the casing support plate 11L is relieved in such a way that both the impact relaxation rib 21L1 and the tilted plate 10L are elastically transformed.

Further, since the impact relaxation ribs 21L1 and 21R1 are formed in the spaces of the lower surfaces of the casing support plates 11L and 11R, it is possible to cause the respective distances between the lower surfaces of the casing support plates 11L and 11R, which function as the outer circumferences, and the cell storage units 3L and 3R to be comparatively long, and thus it is possible to secure a protection function with regard to impact. Further, as shown in FIG. 20, the impact relaxation ribs 21L1 and 21R1 are provided on the cylindrical surfaces of the cell storage units in addition to the bases of the valleys between the adjacent cell storage units. That is, the impact relaxation ribs 21L1 and 21R1 are provided with further higher density compared to other bottoms, foresides, and back sides. The object of this is to securely perform the protection of the circuit on the printed circuit board 8 in addition to the protection of the battery cells 1 because the printed circuit board 8 is arranged on the upper side.

In the above-described embodiment according to the present disclosure, the impact relaxation ribs are integrally formed with each of the cell holders. Therefore, since it is not necessary to add an additional buffer material, such as cushions or the like, it is possible to prevent component score, assembly man-hours, and management man-hours from increasing. Further, there is an advantage in that it is possible to prevent a problem of being affected by variation in the mechanical dimension of the buffer material of the separate component and a problem of the laminating efficiency of the battery pack being lowered because of a space for providing the buffer material from occurring.

Meanwhile, the present disclosure can include the following configurations.
(1) A battery pack including: a plurality of battery cells; a cell support that holds the plurality of battery cells; a connection part that connects to the plurality of battery cells; and a circuit substrate that is used to mount circuits for the plurality of battery cells. The cell support is integrally formed with battery cell storage units that store the plurality of battery cells, a base unit that supports the battery cell storage units, and impact relaxation ribs, and each of the impact relaxation ribs is formed between an outer circumference of the base unit and an exterior surface of each of the battery cell storage units, and is configured in a shape capable of being transformed in a direction to which impact is applied.
(2) In the battery pack of (1), the impact relaxation ribs are configured to be elastically transformable, and are contracted when the impact is applied to the outer circumference.
(3) In the battery pack of (1) or (2), each of the impact relaxation rib has a curved section in a U shape or an inverted U shape.
(4) In the battery pack of (1) or (2), each of the impact relaxation ribs has a curved section in a semicircle shape.

(5) In the battery pack of any one of (1) to (4), the battery cells are cylindrical battery cells, and the cell support includes a plurality of cylindrical cell storage units.
(6) In the battery pack of any one of (1) to (5), each of the impact relaxation ribs is formed between a position between a peripheral surface of one cell storage unit and a peripheral surface of another cell storage unit and the outer circumference.
(7) In the battery pack of any one of (1) to (6), each of the impact relaxation ribs is transformed by impact and configured to stop transformation when two opposite spots come into contact with each other.
(8) In the battery pack of any one of (1) to (7), an inclination shape is formed in the outer circumference, and the impact relaxation rib is formed between the inclination shape and each of the cell storage units.
(9) In the battery pack of any one of (1) to (8), the connection part has a plate shape, and the connection part is attached to the cell support through snap fits by projection parts which are provided on the cell support.
(10) In the battery pack of (9), the projection parts are formed in a negative electrode arrangement region of the cell support.
(11) In the battery pack of (9), an insulating material having elasticity is interposed between the cell support and the connection part excepting connection positions.
(12) In the battery pack of (9), the insulating material is arranged around the connection positions of the positive electrodes of the battery cells.
(13) An electric vehicle which receives electric power from the battery pack of (1).
(14) In the electric vehicle of (13), the electric motorcycle is any one of an electric motorcycle, an electric bicycle and an electric power-assisted bicycle.

2. Application Example

[Electricity Storage System for House as Application Example]

Figure 21:
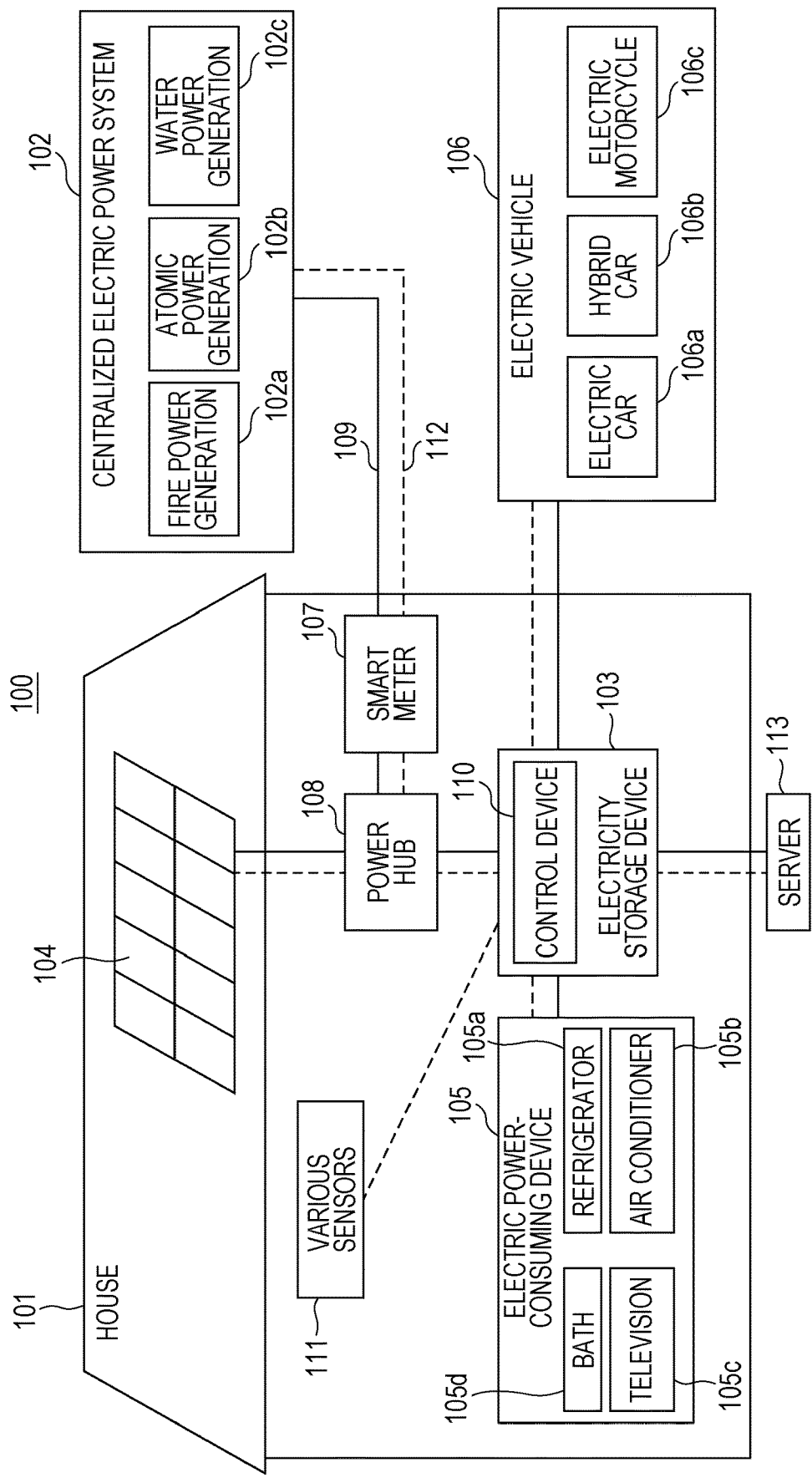
FIG. 21 is a block diagram illustrating an application example of the battery pack.

An example, in which the battery pack according to the embodiment of the present disclosure is applied to an electricity storage system for a house, will be described with reference to FIG. 21. For example, in an electricity storage system 100 for a house 101, electric power is supplied to an electricity storage device 103 from a centralized electric power system 102, such as fire power generation 102a, atomic power generation 102b, water power generation 102c, or the like via an electric power network 109, an information network 112, a smart meter 107, a power hub 108, or the like. Herewith, electric power is supplied to the electricity storage device 103 from an independent power source, such as a domestic electric power-generating device 104 or the like. The supplied electric power is charged in the electricity storage device 103. Electric power which is used for the house 101 is fed by the electricity storage device 103. The same electricity storage system can be used for a building, not only for the house 101.

The house 101 is provided with the electric power-generating device 104, an electric power-consuming device 105, the electricity storage device 103, a control device 110 which controls each device, the smart meter 107, and sensors 111 which acquire various types of information. Each device is connected via the electric power network 109 and the information network 112. A solar battery, a fuel battery, a wind mill, or the like is used as the electric power-generating device 104, and generated electric power is supplied to the electric power-consuming device 105 and/or the electricity storage device 103. The electric power-consuming device 105 includes a refrigerator 105a, an air conditioner 105b, a television receiver 105c, a bath 105d, and the like. Further, the electric power-consuming device 105 includes an electric vehicle 106. The electric vehicle 106 includes an electric car 106a, a hybrid car 106b, and an electric motorcycle 106c. The electric vehicle 106 may include an electric power-assisted bicycle or the like.

The electricity storage device 103 is configured with a secondary battery or a capacitor. For example, the electricity storage device 103 is configured with a lithium-ion secondary battery. The lithium-ion secondary battery may be a stationary battery or a battery which is used for the electric vehicle 106. It is possible to apply the above-described battery pack for the electricity storage device 103. For example, it is possible to use the battery pack, which is used for the electric vehicle 106 (for example, the electric power-assisted bicycle), for the electricity storage device 103. The smart meter 107 has functions to detect the used amount of commercial electric power, and to transmit the detected used amount to an electric power company. The electric power network 109 may combine any one or plurality of direct current power feeding, alternate current power feeding, and contactless power feeding.

The various sensors 111 include, for example, a human detection sensor, an illuminance sensor, an object detection sensor, an electric power-consumption sensor, an oscillation sensor, a contact sensor, a thermal sensor, an infra-red sensor, and the like. Information which is acquired by the various sensors 111 is transmitted to the control device 110. A weather condition, a person's condition, or the like is detected by the information from the sensors 111, the electric power-consuming device 105 is automatically controlled, and thus it is possible to minimize energy consumption. Further, the control device 110 can transmit information relevant to the house 101 to an external electric power company or the like via the Internet.

The power hub 108 enables a process, such as separation of electric power lines, DC-AC conversion, or the like, to be performed. The communication method of the information network 112 which is connected to the control device 110 includes a method of using a communication interface, such as Universal Asynchronous Receiver Transmitter (UART: a transmission-reception circuit for asynchronous serial communication) or the like, and a method of using a sensor network in conformity of a wireless communication standard such as Bluetooth (registered trademark), ZigBee, Wi-Fi, or the like. The Bluetooth (registered trademark) method is applied to multimedia communication, and thus one-to-multiple connection communication can be performed. ZigBee uses an Institute of Electrical and Electronics Engineers (IEEE) 802.15.4 physical layer. The IEEE 802.15.4 is the name of a short distance wireless network standard which is called Personal Area Network (PAN) or Wireless (W) PAN.

The control device 110 is connected to an external server 113. The server 113 may be managed by any one of the house 101, an electric power company, and a service provider. Information which is received and transmitted by the server 113 is relevant to, for example, electric power consumption information, life pattern information, electric power charge, weather information, disaster information, and electric power transaction. Although these types of information may be transmitted to and received from the electric power-consuming device (for example, the television receiver) at home, the information may be transmitted to and received from an external device (for example, a mobile phone or the like). These types of information may be displayed on an apparatus which includes a display function, for example, a television receiver, a mobile phone, a Personal Digital Assistants (PDA), or the like.

The control device 110 which controls each section includes a CPU, a RAM, a ROM, and the like, and is stored in the electricity storage device 103 in the example. The control device 110 is connected to the electricity storage device 103, the domestic electric power-generating device 104, the electric power-consuming device 105, the various sensors 111, and the server 113 via the information network 112, and includes a function of adjusting, for example, the used amount and the generated amount of commercial electric power. Meanwhile, in addition, the control device 110 may include a function of performing an electric power transaction in an electric power market.

As above, not only the electric power stored in the centralized electric power system 102, such as fire power generation 102*a*, atomic power generation 102*b*, water power generation 102*c*, and the like, but also electric power generated from the domestic electric power-generating device 104 (solar energy generation, wind power generation) can be stored in the electricity storage device 103. Therefore, even when the generated electric power of the domestic electric power-generating device 104 changes, it is possible to perform control such that the amount of electric power which is transmitted to the outside is uniform or such that the electric power is discharged as much as necessary. For example, it is possible to implement a way in which electric power which is acquired through solar power generation is stored in the electricity storage device 103, late-night electric power which is inexpensive is stored in the electricity storage device 103 at night, and the electric power which is stored in the electricity storage device 103 is discharged and used in a period of time during the day in which the power rate is expensive.

Meanwhile, although an example in which the control device 110 is stored in the electricity storage device 103 has been described, the control device 110 may be stored in the smart meter 107 and may be independently configured. Further, the electricity storage system 100 may be used for a plurality of households of an aggregated house and may be used for a plurality of single houses.

[Electricity Storage System for Vehicle as Application Example]

Figure 22:
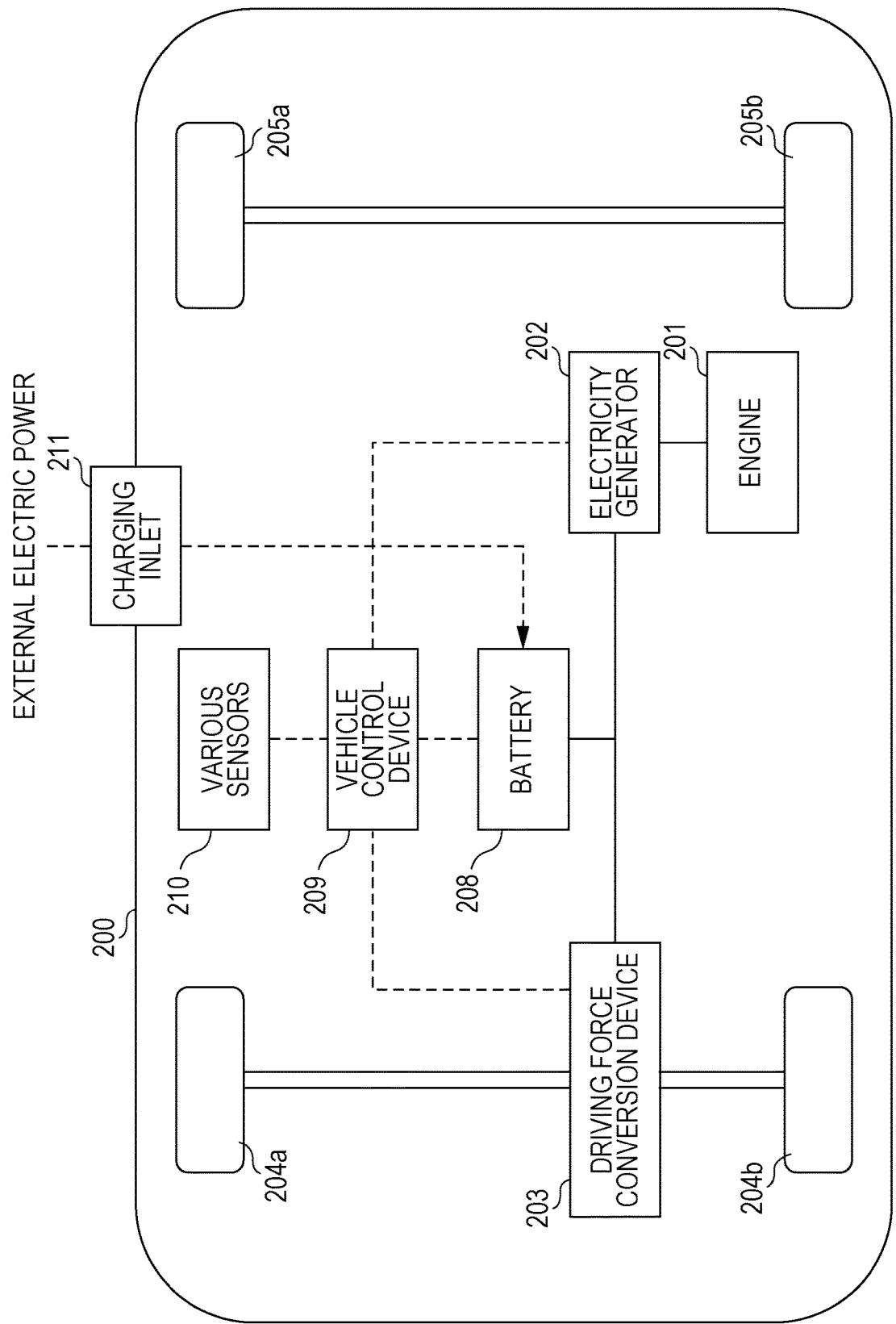
FIG. 22 is a block diagram illustrating another application example of the battery pack.

An example in which an embodiment of the present disclosure is applied to an electricity storage system for a vehicle will be described with reference to FIG. 22. FIG. 22 briefly illustrates an example of the configuration of a hybrid car which uses a series hybrid system to which the present disclosure is applied. The series hybrid system is a vehicle which travels using an electricity-driving force conversion device using electric power which is generated by an electricity generator activated by an engine or electric power which is once stored in a battery.

A hybrid car 200 is mounted with an engine 201, an electricity generator 202, an electricity-driving force conversion device 203, a drive wheel 204*a*, a drive wheel 204*b*, a wheel 205*a*, a wheel 205*b*, a battery 208, a vehicle control device 209, various sensors 210, and a charging inlet 211. The above-described battery pack according to the embodiment of the present disclosure is applied to the battery 208. One or a plurality of electricity storage systems are applied.

The hybrid car 200 travels by using the electricity-driving force conversion device 203 as a power source. An example of the electricity-driving force conversion device 203 is a motor. The electricity-driving force conversion device 203 is operated by the electric power of the battery 208, and the torque of the electricity-driving force conversion device 203 is transmitted to the drive wheels 204*a* and 204*b*. Meanwhile, Direct Current-Alternate Current (DC-AC) conversion or reverse conversion (AC-DC conversion) are used in necessary parts, and thus the electricity-driving force conversion device 203 can be applied to both an AC motor and a DC motor. The various sensors 210 control the number of rotations of the engine via the vehicle control device 209 or control a throttle valve position (throttle position) which is not shown in the drawing. The various sensors 210 include a speed sensor, an acceleration sensor, an engine rotation number sensor, and the like.

The torque of the engine 201 is transmitted to the electricity generator 202, and thus it is possible to store electric power, which is generated by the electricity generator 202 based on the torque, in the battery 208.

If the speed of the hybrid car decreases due to a control mechanism which is not shown in the drawing, resistance force obtained when the speed is reduced is applied to the electricity-driving force conversion device 203 as the torque, and regenerative electric power which is generated by the electricity-driving force conversion device 203 based on the torque is stored in the battery 208.

Since the battery 208 is connected to the external power source of the hybrid car, the battery can receive the supply of electric power from the external power source by using the charging inlet 211 as an input port and store the received electric power.

Although not shown in the drawing, an information processing device, which processes information relevant to car control based on information relevant to the secondary battery, may be provided. For example, there is an information processing device, which displays residual battery amount based on information relevant to residual amount of the battery, as the information processing device.

Meanwhile, hereinbefore, the series hybrid vehicle, which travels by a motor using electric power generated by the electricity generator operated by an engine or electric power which is once stored in the battery, has been described as an example. However, the present disclosure can be effectively applied to a parallel hybrid car which uses the output of both an engine and a motor as driving source, and which appropriately switches over and uses three methods of travelling using only the engine, travelling using only the motor, and traveling using both the engine and the motor. Further, the present disclosure can be effectively applied to a so-called electric vehicle which travels using only a driving motor without an engine.

3. Modification Example

Hereinbefore, although the embodiment according to the present disclosure is described in detail, the present disclosure is not limited to the above-described embodiment, and various modifications are possible based on the technical spirit of the present disclosure. For example, the configuration, the method, the process, the shape, the material, the numerical values, and the like which are exemplified in the above-described embodiment are only examples, and different configuration, method, process, shape, material, numerical value, and the like may be used if necessary.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
   a plurality of battery cells;
   a cell holder including a peripheral wall and a plurality of cell storage units; and
   a plurality of ribs,
   wherein the plurality of ribs are integrated with the cell holder between the peripheral wall and the cell storage units.

2. The battery pack according to claim 1, wherein the ribs are configured to be elastically transformable, and the ribs are contracted when impact is applied to the battery pack.

3. The battery pack according to claim 1, wherein at least one of the ribs includes a connection section and at least one of a curved section, a semicircular curved section, a square frame-shaped curved section and a bended curved section.

4. The battery pack according to claim 1 further comprising a circuit substrate, wherein the circuit substrate is configured to mount circuits for the battery cells.

5. The battery pack according to claim 1, wherein the battery cells and the cell storage units have cylindrical shape.

6. The battery pack according to claim 1, wherein at least one of the ribs is provided between a peripheral surface of a first cell storage unit and a peripheral surface of a second cell storage unit.

7. The battery pack according to claim 1, wherein at least one of the ribs is configured to be transformed by impact to the battery pack.

8. The battery pack according to claim 1, wherein an inclination shape is formed in an outer circumference of the cell holder, and at least one of the ribs is provided between the inclination shape and a cell storage unit.

9. The battery pack according to claim 1, further comprising a connection part configured to connect to the battery cells, wherein the connection part is attached to the cell holder through snap fits by projection parts which are provided on the cell holder.

10. The battery pack according to claim 9, wherein the projection parts are provided in a negative electrode arrangement region of the cell holder.

11. The battery pack according to claim 9, wherein an insulating material having elasticity is interposed between the cell holder and the connection part.

12. The battery pack according to claim 11, wherein the insulating material is arranged around positive electrodes of the battery cells.

13. An electric vehicle that receives electric power from the battery pack according to claim 1.

14. The electric vehicle according to claim 13, wherein the electric vehicle is one of an electric motorcycle, an electric bicycle and an electric power-assisted bicycle.

15. An electricity storage device comprising the battery pack according to claim 1.

16. An electricity storage system comprising the battery pack according to claim 1.

* * * * *